United States Patent
Lee et al.

(10) Patent No.: US 10,097,858 B2
(45) Date of Patent: Oct. 9, 2018

(54) METHOD AND APPARATUS FOR CODING MULTI-VIEW VIDEO, AND METHOD AND APPARATUS FOR DECODING MULTI-VIEW VIDEO

(71) Applicant: SAMSUNG ELECTRONICS CO., LTD., Suwon-si (KR)

(72) Inventors: Jin-young Lee, Hwaseong-si (KR); Min-woo Park, Yongin-si (KR); Yong-jin Cho, Seoul (KR); Byeong-doo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 272 days.

(21) Appl. No.: 15/098,643

(22) Filed: Apr. 14, 2016

(65) Prior Publication Data

US 2016/0227251 A1    Aug. 4, 2016

Related U.S. Application Data

(63) Continuation of application No. PCT/KR2014/009633, filed on Oct. 14, 2014.
(Continued)

(51) Int. Cl.
*H04N 19/597* (2014.01)
*H04N 19/52* (2014.01)
(Continued)

(52) U.S. Cl.
CPC .......... *H04N 19/597* (2014.11); *H04N 19/33* (2014.11); *H04N 19/52* (2014.11); *H04N 19/593* (2014.11); *H04N 19/70* (2014.11); *H04N 19/105* (2014.11)

(58) Field of Classification Search
CPC ...... H04N 19/105; H04N 19/33; H04N 19/52; H04N 19/593; H04N 19/597; H04N 19/70
See application file for complete search history.

(56) References Cited

U.S. PATENT DOCUMENTS 8,532,410 B2    9/2013   Tian et al.
9,241,168 B2    1/2016   Kim et al.
(Continued)

FOREIGN PATENT DOCUMENTS

KR    10-2008-0092359 A    10/2008
KR    10-2010-0049855 A     5/2010
(Continued)

OTHER PUBLICATIONS

Muller, et al.; "3D High-Efficiency Video Coding for Multi-View Video and Depth Data", IEEE Transactions on Image Processing, vol. 22, No. 9, Sep. 2013, 13 pages total.
(Continued)

Primary Examiner — Anner N Holder
(74) Attorney, Agent, or Firm — Sughrue Mion, PLLC

(57) ABSTRACT

Provided is a merge mode for determining, by using motion information of another block, motion information of pictures that construct a multiview video. A multiview video decoding method includes obtaining motion inheritance information specifying whether or not motion information of a corresponding block of a first layer which corresponds to a current block of a second layer is available as motion information of the second layer, obtaining a merge candidate list by selectively including the motion information of the corresponding block in merge candidates when the current block that was encoded according to the merge mode is decoded, determining a merge candidate included in the merge candidate list according to merge candidate index
(Continued)

information, and obtaining motion information of the current block, based on the merge candidate.

12 Claims, 31 Drawing Sheets

Related U.S. Application Data

(60) Provisional application No. 61/890,441, filed on Oct. 14, 2013.

(51) Int. Cl.
*H04N 19/593* (2014.01)
*H04N 19/33* (2014.01)
*H04N 19/105* (2014.01)
*H04N 19/70* (2014.01)

(56) References Cited

U.S. PATENT DOCUMENTS

| | | |
|---|---|---|
| 2012/0314027 A1 | 12/2012 | Tian et al. |
| 2012/0320986 A1 | 12/2012 | Shimizu et al. |
| 2014/0161186 A1* | 6/2014 | Zhang ............... H04N 19/597 375/240.16 |
| 2014/0254681 A1* | 9/2014 | Aminlou ............ H04N 19/105 375/240.16 |

FOREIGN PATENT DOCUMENTS

| KR | 10-2011-0006696 A | 1/2011 |
|---|---|---|
| KR | 10-2012-0118043 A | 10/2012 |

OTHER PUBLICATIONS

Search Report dated Jan. 19, 2015, issued by the International Searching Authority in counterpart International Application No. PCT/KR2014/009633 (PCT/ISA/210).

Written Opinion dated Jan. 19, 2015, issued by the International Searching Authority in counterpart International Application No. PCT/KR2014/009633 (PCT/ISA/237).

\* cited by examiner

FIG. 14

| vps_extension2( ) { | Descriptor |
|---|---|
|   while( !byte_aligned( ) ) | |
|     vps_extension_byte_alignment_reserved_one_bit | u(1) |
|   for( i = 1; i <= vps_max_layers_minus1; i++ ) { | |
|     layerId = layer_id_in_nuh[ i ] | |
|     iv_mv_pred_flag[ layerId ] | u(1) |
|     iv_mv_scaling_flag[ layerId ] | u(1) |
|     if ( !VpsDepthFlag[ layerId ] ) { | |
|       log2_sub_pb_size_minus3[ layerId ] | ue(v) |
|       iv_res_pred_flag[ layerId ] | u(1) |
|       depth_refinement_flag[ layerId ] | u(1) |
|       view_synthesis_pred_flag[ layerId ] | u(1) |
|       depth_based_blk_part_flag[ layerId ] | u(1) |
|     } else { | |
|       mpi_flag[ layerId ] | u(1) |
|       log2_mpi_sub_pb_size_minus3[ layerId ] | ue(v) |
|       dmm_cpredtex_flag[ layerId ] | u(1) |
|       intra_sdc_dmm_wfull_flag[ layerId ] | u(1) |
|       lim_qt_pred_flag[ layerId ] | u(1) |
|       inter_sdc_flag[ layerId ] | u(1) |
|     } | |
|   } | |
|   cp_precision | ue(v) |
|   for( i = 1; i < NumViews; i++ ) { | |
|     cp_present_flag[ i ] | u(1) |
|     if( cp_present_flag[ i ] ) { | |
|       cp_in_slice_segment_header_flag[ i ] | u(1) |
|       if( !cp_in_slice_segment_header_flag[ i ] ) | |
|         for( j = 0; j < i; j++ ) { | |
|           vps_cp_scale[ i ][ j ] | se(v) |
|           vps_cp_off[ i ][ j ] | se(v) |
|           vps_cp_inv_scale_plus_scale[ i ][ j ] | se(v) |
|           vps_cp_inv_off_plus_off[ i ][ j ] | se(v) |
|         } | |
|       } | |
|     } | |
|   } | |

1410 → mpi_flag[ layerId ]

FIG. 18

```
i = 0
if( availableFlagT )
        extMergeCandList[ i++ ] = T
if( availableFlagD )
        extMergeCandList[ i++ ] = D
if( availableFlagIvMC && ( !availableFlagT || differentMotion( T, IvMC ) ) )
        extMergeCandList[ i++ ] = IvMC
N = DepthFlag ? T : IvMC
if( availableFlagA1 && ( !availableFlagN || differentMotion( N, A$_1$ ) ) )
        extMergeCandList[ i++ ] = A$_1$
if( availableFlagB1 && ( !availableFlagN || differentMotion( N, B$_1$ ) ) )
        extMergeCandList[ i++ ] = B
if( availableFlagB )$_0$
        extMergeCandList[ i++ ] = B$_0$
if( availableFlagIvDC && ( !availableFlagA1 || differentMotion( A1, IvDC ) ) &&
    ( !availableFlagB1 || differentMotion( B1, IvDC ) )&&( i < ( 5 + NumExtraMergeCand ) ) )
        extMergeCandList[ i++ ] = IvDC
if( availableFlagVSP && !ic_flag && iv_res_pred_weight_idx = = 0 &&
            i < ( 5 + NumExtraMergeCand ) )
        extMergeCandList[ i++ ] = VSP
if( availableFlagA0 && i < ( 5 + NumExtraMergeCand ) )
        extMergeCandList[ i++ ] = A$_0$
if( availableFlagB2 && i < ( 5 + NumExtraMergeCand ) )
        extMergeCandList[ i++ ] = B$_2$
if( availableFlagIvMCShift && i < ( 5 + NumExtraMergeCand ) &&
    ( !availableFlagIvMC || differentMotion( IvMC, IvMCShift ) ) )
        extMergeCandList[ i++ ] = IvMCShift
if( availableFlagIvDCShift && i < ( 5 + NumExtraMergeCand ) )d
        extMergeCandList[ i++ ] = IvDCShift
        j = 0
        while( i < MaxNumMergeCand ) {
            N = baseMergeCandList[ j++ ]
            if( N!=A1 && N!= B1 && N!= B0 && N!= A0 && N != B$_2$)
            extMergeCandList[ i++ ] = N
        }
```

FIG. 26
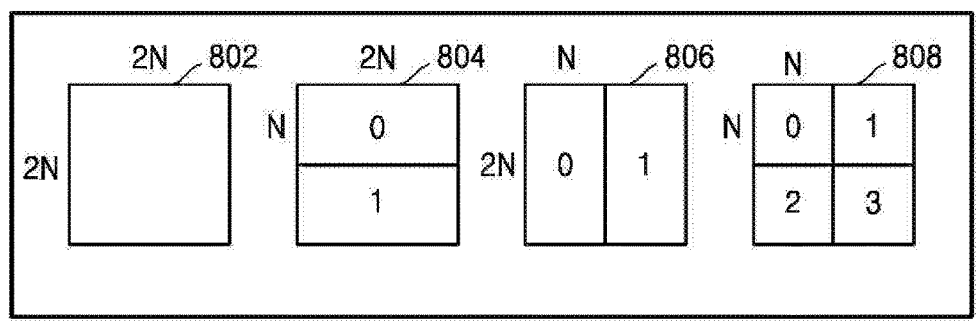
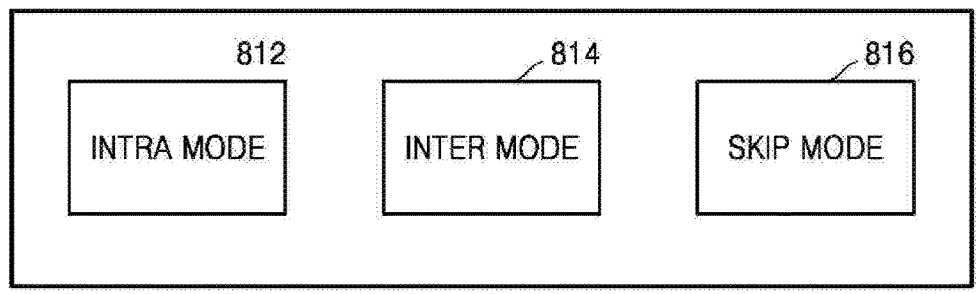
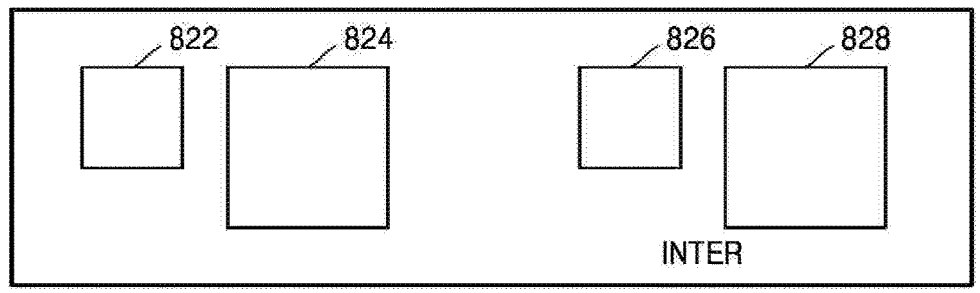

CODING UNIT (1010)

METHOD AND APPARATUS FOR CODING MULTI-VIEW VIDEO, AND METHOD AND APPARATUS FOR DECODING MULTI-VIEW VIDEO

TECHNICAL FIELD

The present invention relates to methods and apparatus for encoding and decoding a video, and more particularly, to a merge mode of determining, by using motion information of another block, motion information of pictures that construct a multiview video.

BACKGROUND ART

Recently, due to developments in digital image processing and computer graphic technologies, research on a three-dimensional (3D) video technology and a multiview video technology that reproduce a real world and allow a realistic experience of the reproduction has been actively performed. A 3D television (TV) using a multiview video can provide a user with a realistic feeling due to contents reconstructed from a real world and thus is highlighted as a next-generation broadcasting technology. A 3D video coding system has a multiview video support function so as to allow a user to freely change a watching view point or to allow the multi-view video to be reproducible in various types of a 3D reproducing apparatus. However, since a data amount is increased in the multiview video, there is a demand for an efficient coding method of decreasing the data mount of the multiview video.

DETAILED DESCRIPTION OF THE INVENTION

Technical Problem

The present invention relates to using motion information of a previously encoded or decoded layer image as motion information of another layer image by considering correlation between layer images that construct a multiview video. In more detail, the present invention relates to determining motion information of a corresponding depth image by using motion information of a color texture image, by taking into account correlation between the color texture image and the depth image.

Technical Solution

The present invention relates to adding, to a bitstream, motion inheritance information specifying whether or not to inherit motion information of an image of a previous layer, and encoding or decoding a current block of a current layer by adding motion information of a corresponding block of the previous layer to a merge candidate, based on the motion inheritance information.

Advantageous Effects of the Invention

According to embodiments of the present invention, coding efficiency may be increased by determining, from a previous layer image, motion information of a layer image that is currently encoded/decoded, by taking into account correlation between layer images that construct a multiview video.

DESCRIPTION OF THE DRAWINGS

FIG. 14 illustrates video parameter set (VPS) extension information, according to an embodiment.

FIG. 18 illustrates an example of pseudo code for forming a merge candidate list for a multiview video, according to an embodiment.

FIG. 26 illustrates a plurality of pieces of encoding information, according to various embodiments.

BEST MODE

Figure 1:
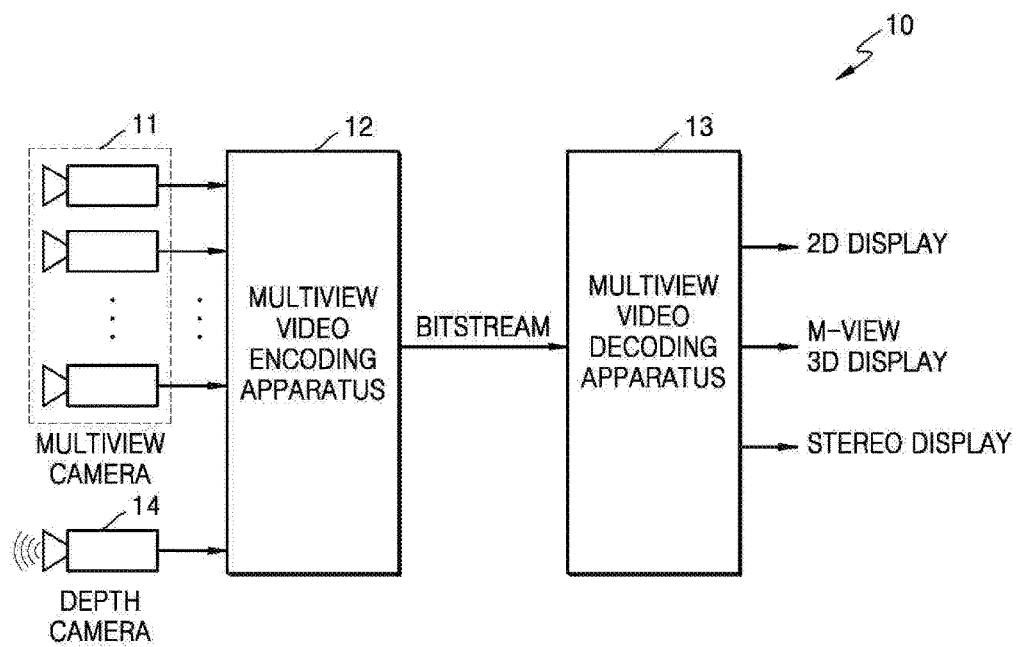
FIG. 1 illustrates a multiview video system, according to an embodiment of the present invention.

According to an aspect of the present invention, there is provided a multiview video decoding method including obtaining, from a bitstream, motion inheritance information specifying whether or not motion information of a corresponding block of a first layer which corresponds to a current block of a second layer is available as motion information of the second layer; obtaining prediction mode information of the current block from the bitstream; when a prediction mode of the current block is a merge mode, and the motion inheritance information specifies that the motion information of the corresponding block is available as the motion information of the second layer, obtaining a merge candidate list including, as a merge candidate, the motion information of the corresponding block; obtaining, from the bitstream, merge index information indicating a merge candidate that is from among merge candidates included in the merge candidate list and is to be used in predicting the current block; and obtaining motion information of the current block, based on the merge index information.

According to another aspect of the present invention, there is provided a multiview video decoding apparatus including a parser configured to obtain, from a bitstream, motion inheritance information specifying whether or not motion information of a corresponding block of a first layer which corresponds to a current block of a second layer is available as motion information of the second layer, prediction mode information of the current block, and merge index information indicating a merge candidate that is from among merge candidates included in a merge candidate list and is to be used in predicting the current block; and an inter predictor configured to obtain the merge candidate list including, as a merge candidate, the motion information of the corresponding block, when a prediction mode of the current block is a merge mode, and the motion inheritance information specifies that the motion information of the corresponding block is available as the motion information of the second layer, and to obtain motion information of the current block, based on the merge index information.

According to another aspect of the present invention, there is provided a multiview video encoding method including determining whether motion information of a corresponding block of a first layer which corresponds to a current block of a second layer is available as motion information of the second layer; when the motion information of the corresponding block is available as the motion information of the second layer, determining a merge candidate list including, as a merge candidate, the motion information of the corresponding block; performing inter prediction on the current block by using merge candidates included in the merge candidate list, and determining, from among the merge candidates, a merge candidate to be used in predicting the current block; and adding, to a bitstream, motion inheritance information specifying whether the motion information of the corresponding block of the first layer is available as the motion information of the second layer, prediction mode information related to the current block, and merge index information indicating the determined merge candidate.

According to another aspect of the present invention, there is provided a multiview video encoding apparatus including an inter predictor configured to determine whether motion information of a corresponding block of a first layer which corresponds to a current block of a second layer is available as motion information of the second layer, to determine a merge candidate list including, as a merge candidate, the motion information of the corresponding block when the motion information of the corresponding block is available as the motion information of the second layer, to perform inter prediction on the current block by using merge candidates included in the merge candidate list, and to determine, from among the merge candidates, a merge candidate to be used in predicting the current block; and an output unit configured to add, to a bitstream, motion inheritance information specifying whether the motion information of the corresponding block of the first layer is available as the motion information of the second layer, prediction mode information related to the current block, and merge index information indicating the determined merge candidate.

Mode of the Invention

Hereinafter, with reference to FIGS. 1 through 18, a multilayer video encoding method and a multilayer video decoding method based on a coding unit of a tree structure according to embodiments are provided. Also, with reference to FIGS. 19 through 31, a method of encoding and decoding an independent layer, based on a coding unit of a tree structure, according to an embodiment is provided.

Hereinafter, an "image" may denote a still image or a moving image of a video, or a video itself.

Hereinafter, a "sample" means data that is allocated to a sampling position of an image and is a processing target. For example, pixels in an image in a spatial domain may be samples.

Hereinafter, a "layer image" denotes specific-view images or specific-type images. In a multiview video, one layer image indicates color images or depth images which are input at a specific view. For example, in a three-dimensional (3D) video, each of a left-view texture image, a right-view texture image, and a depth image forms one layer image. That is, the left-view texture image may form a first layer image, the right-view texture image may form a second layer image, and the depth image may form a third layer image.

FIG. 1 illustrates a multiview video system, according to an embodiment of the present invention.

A multiview video system 10 includes a multiview video encoding apparatus 12 and a multiview video decoding apparatus 13, wherein the multiview video encoding apparatus 12 generates a bitstream by encoding a multiview video image captured by two or more multiview cameras 11, a depth image of a multiview image captured by a depth camera 14, and a plurality of pieces of parameter information related to the multiview cameras 11, and the multiview video decoding apparatus 13 decodes the bitstream and provides a decoded multiview video frame in various forms according to use requirements.

The multiview cameras 11 are configured of a plurality of combined cameras having different views, and provide a multiview video image for every frame. In descriptions below, a color image obtained for each of views according to a predetermined color format such as YUV, YCbCr, and the like may be referred to as a texture image.

The depth camera 14 provides a depth image where depth information of a scene is expressed as an 8-bit image of 256 levels. The number of bits for expressing one pixel in the depth image may not be 8 bits and may be changed. The depth camera 14 may measure a distance between a camera and an object and between the camera and a background by using an infrared ray and thus may provide a depth image having a value that is proportional or inverse-proportional to the distance. As such, a one-view image includes a texture image and a depth image.

When the multiview video encoding apparatus 12 encodes and transmits a texture image and a corresponding depth image at multiple views, the multiview video decoding apparatus 13 may provide, by using the texture image and the depth image at the multiple views which are included in the bitstream, not only a 3D effect through a conventional stereo image or 3D image but may also synthesize and provide a 3D image corresponding to a viewer-desired predetermined view. A header of the bitstream of multiview video data may include information specifying whether or not information about the depth image is included in a data packet, and image-type information specifying whether each data packet is related to a texture image or to a depth image. According to a hardware capability of a receiver, when a depth image is used to reconstruct a multiview video, the multiview video may be reconstructed by using a received depth image, however, in a case where a depth image cannot be used because hardware of a receiver does not support a multiview video, a received data packet associated with the depth image may be discarded. In this manner, when a receiver cannot display a multiview image, an image corresponding to a certain view from among the multiview image may be displayed as a two-dimensional (2D) image.

With respect to multiview video data, an amount of encoded data is increased in proportion to the number of views, and a depth image for realizing a 3D effect has to be encoded, thus, in order to implement the multiview video system shown in FIG. 1, it is necessary to efficiently compress a large amount of the multiview video data.

Figure 2:
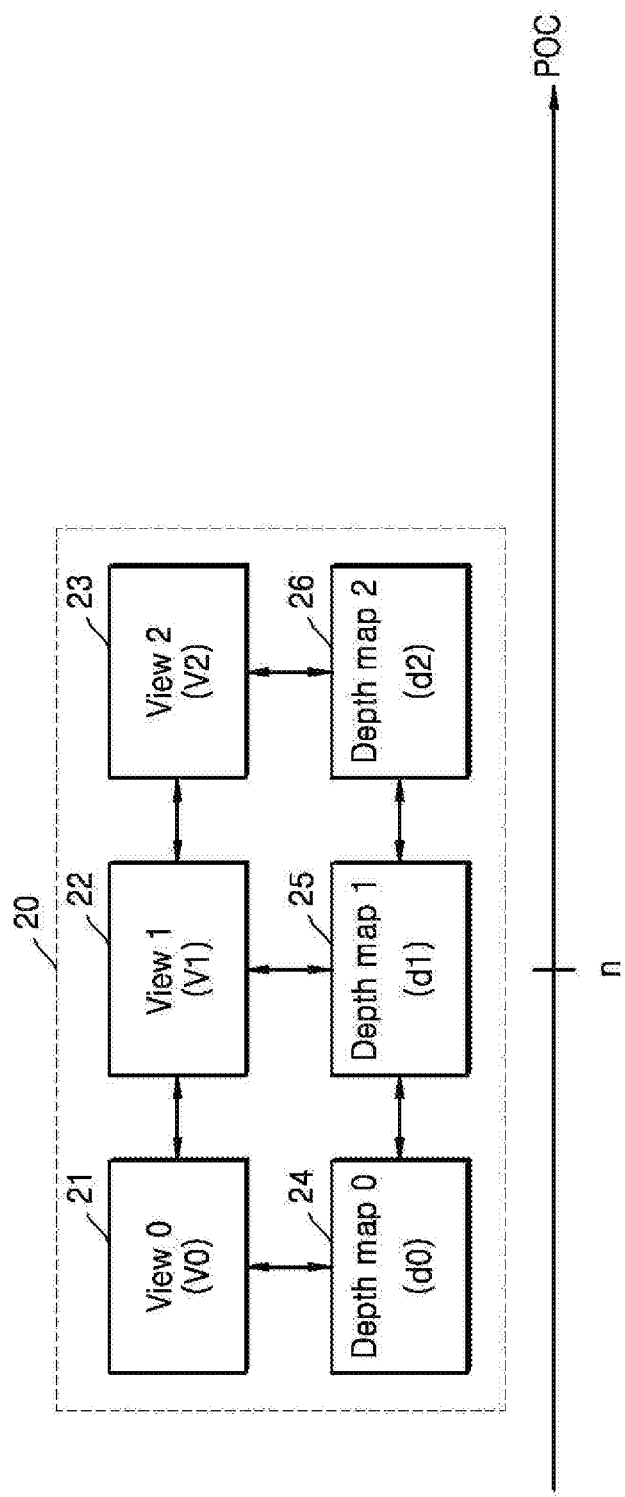
FIG. 2 illustrates examples of texture images and depth images that construct a multiview video.

FIG. 2 illustrates examples of texture images and depth images that construct a multiview video.

FIG. 2 illustrates a texture picture V0 21 at a first view View 0, and a depth image picture d0 24 corresponding to the texture picture V0 21 at the first view View 0, a texture picture V1 22 at a second view View 1, and a depth image picture d1 25 corresponding to the texture picture V1 22 at the second view View 1, and a texture picture V2 23 at a third view View 2, and a depth image picture d2 26 corresponding to the texture picture V2 23 at the third view View 2. While FIG. 2 illustrates the multiview texture pictures V0 21, V1 22, and V2 23 representing the three views View 0, View 1, and View 2 and the corresponding depth images d0 24, d1 25, and d2 26, the number of views is not limited thereto and may be changed.

The multiview texture pictures V0 21, V1 22, and V2 23 and the corresponding depth images d0 24, d1 25, and d2 26 are pictures that are input at the same time and thus have a same picture order count (POC). In the descriptions below, a picture group 1500 such as the multiview texture pictures V0 21, V1 22, and V2 23 and the corresponding depth images d0 24, d1 25, and d2 26 which each have an equal n POC value (where n is an integer) may be referred to as an $n^{th}$ picture group.

A picture group having a same POC may form one access unit. An encoding order of an access unit may not be equal to a capturing order (an input order) of an image or a display order of the image, and the encoding order of the access unit may be different from the capturing order or the display order by taking into account a reference relation.

In order to specify a view of a texture image and a depth image at each view, a view identifier ViewId that is a view order index may be used. A texture image and a depth image at a same view have a same view identifier. A view identifier may be used in determining an encoding order. For example, the multiview video encoding apparatus 12 may encode the multiview video in a value order from a small view identifier value toward a large view identifier value. That is, the multiview video encoding apparatus 12 may encode a texture image and a depth image whose ViewId is 0, and then may encode a texture image and a depth image whose ViewId is 1. In this manner, when the encoding order is determined based on view identifiers, it is possible to recognize occurrence of an error of data received by using the view identifiers in an environment where the error may easily occur. However, an encoding/decoding order of images of respective views does not depend on a value order of the view identifiers and may be changed.

Figure 3:
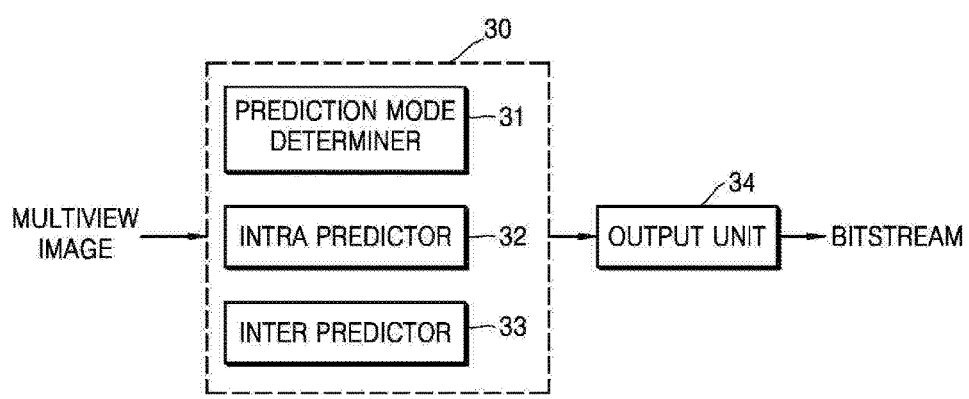
FIG. 3 is a block diagram of a multiview video encoding apparatus, according to an embodiment.

FIG. 3 is a block diagram of a multiview video encoding apparatus, according to an embodiment.

Referring to FIG. 3, the multiview video encoding apparatus includes a multiview video encoder 30 and an output unit 34.

The multiview video encoder 30 prediction encodes an input texture image and an input depth image at multiple views. The multiview video encoder 30 uses prediction so as to decrease information overlapping in a multiview image. In more detail, an intra predictor 32 predicts a current block by referring to reconstructed samples in the vicinity of the current block. An inter predictor 33 performs inter prediction of generating a prediction value with respect to the current block from a previously encoded/decoded picture. A prediction mode determiner 31 determines an optimal prediction mode for the current block by comparing costs of encoded result values according to various intra prediction modes and inter prediction modes, and outputs information of the determined prediction mode.

A process of searching for, during inter prediction, an optimal prediction block from reference pictures is called motion estimation. In order to perform more accurate motion estimation, a reconstructed picture may be interpolated according to types of video codecs, and the motion compensation may be performed on an interpolated image in a unit of a sub-pixel. Motion compensation means that a prediction block is generated based on motion information (a motion vector, a reference picture index) related to the optimal prediction block found in the motion estimation. The inter predictor 33 searches for the optimal prediction block from reference pictures due to the motion estimation process, and generates the prediction block due to the motion compensation process.

The multiview video encoder 30 generates the prediction block for the current block due to the intra prediction or the inter prediction, and performs transformation, quantization, and entropy encoding on a residual signal that is a difference value between the prediction block and an original block.

The output unit 34 generates a bitstream by multiplexing data associated with the prediction encoded multiview video. In an embodiment, the output unit 34 generates and outputs a data packet by multiplexing the data associated with the multiview video in a unit of a Network Adaptive Layer (NAL).

In order to transmit intra predicted image data, information about the prediction mode of the current block, information for specifying the intra prediction mode from among the intra prediction modes, which is applied to the current block, and a residual signal that is a difference value between the current block and the prediction block may be included in the bitstream. For example, as information about a current block that is intra predicted based on HEVC, the bitstream may include the information about the intra prediction mode, which is applied to the current block, from among 35 intra prediction modes such as a DC mode, a planar mode, direction modes having 33 directions, etc.

In order to transmit inter predicted image data, the bitstream may include the information about the prediction mode of the current block, information about a reference picture list such as a list 0, a list 1, etc., an index information ref idx indicating a reference picture that is used in inter predicting the current block and is from among reference pictures included in the reference picture list, and information about a motion vector of the current block. The current block that is inter predicted or intra predicted based on High Efficiency Video Coding (HEVC) may be a prediction unit (PU). Encoding/decoding techniques based on the HEVC are described later with reference to FIGS. 19 through 31.

In order to decrease an amount of motion information transmitted during inter prediction, modes including a merge mode using correlation of motion information between an adjacent block and a current block, and an advanced motion vector prediction (AMVP) mode may be used. The merge mode and the AMVP mode are special cases of the inter prediction, and in the merge mode and the AMVP mode, a list of previous blocks for deriving motion information by using previous blocks that are processed before the current block and are temporally and spatially associated with the current block is configured, and selection information with respect to a previous block in the list is transmitted to a decoder (a decoding apparatus). In the merge mode and the AMVP mode, an encoder (an encoding apparatus) and the decoder (the decoding apparatus) obtain a candidate list of a previous block from which motion information is obtained via a same procedure. In a merge skip mode, only selection information with respect to a previous block in a merge candidate list is transmitted without transmission of a residual signal. That is, in the merge skip mode, only merge index information from which motion information is obtained from among the merge candidate list is included in a bitstream and is transmitted, and in the merge mode, the merge index information and the residual signal are included in the bitstream and are transmitted.

As described above, the multiview image includes texture images input via a plurality of views, and a depth image. It is assumed that a texture image input via one view, and a depth image form layer images, respectively. For example, in a 3D video, each of a left-view texture image, a right-view texture image, and a left-view depth image, and a right-view depth image may form one layer image. Also, in the 3D video, only one depth image may be used as a depth image, and a left-view depth image and a right-view depth image may be generated from camera parameter information according to a view difference between a left view and a right view. In this case, each of the left-view texture image, the right-view texture image, and one depth image forms a layer image, so that the 3D video may be constructed of three layer images.

High correlation is present between images of each of layers that construct a multiview image. For example, correlation may be present between a texture image and a depth image of a same view since an image at a same time and a same view is expressed as a color and a depth. Also, correlation may be present between a texture image and a depth image which are input at different moments of time and represent different views. Therefore, a multiview image may have various types of available reference pictures, and inter prediction may be performed thereon in various manners. That is, it is not limited to a case in which inter prediction is performed only in a temporal direction when the inter prediction is performed on a single-view image according to the related art, thus, when the inter prediction is performed on the multiview image, the inter prediction may be performed not only in a temporal direction but also may be performed in a view direction. Also, since correlation is present between a texture image and a depth image that correspond to each other, the texture image and the depth image may be inter predicted by referring to each other. In general, the texture image includes a large amount of information, the depth image may be inter predicted by referring to the texture image.

Therefore, the inter predictor 33 according to an embodiment may perform inter-layer prediction so as to predict a picture of a current layer from a picture of another layer in various manners, by taking into account correlation between pictures that construct the multiview video.

A layer image that is independently encoded/decoded without referring to another layer image is defined as an independent layer image, and a layer image that is encoded/decoded by referring to another layer image is defined as a dependent layer image. The dependent layer image may be encoded/decoded by referring to another layer image that is previously encoded/decoded.

As described above, the merge mode is a technique of deriving a reference direction, a reference picture index, and a motion vector predictor (MVP) value from a previous block that is previously processed before a current block. A motion vector value is determined based on the MVP value derived via merge. An encoder (encoding apparatus) forms a merge candidate by searching for adjacent blocks on which motion prediction is performed, and signals, as a merge index, merge block information selected as a result of motion search to the decoder (decoding apparatus).

The inter predictor 33 according to an embodiment and an inter predictor 55 of the decoder to be described at a later time may include at least one from among candidates below, as a merge candidate to be used in the merge mode. The merge candidate is not limited to the candidates below, and various types of the candidate may be added or skipped according to a prediction technique.

(1) Motion Parameter Inheritance candidate
(2) Inter-view candidate
(3) Spatial candidate
(4) Disparity candidate
(5) Temporal candidate
(6) View synthesis prediction (VSP) candidate From among these, (1) Motion Parameter Inheritance candidate, (2) Inter-view candidate, (3) Spatial candidate, and (5) Temporal candidate may be previous blocks included not only in a layer image at a same view as a current block but also included in a layer image at another view. (4) Disparity candidate and (6) View synthesis prediction (VSP) candidate may be previous blocks included in a layer image at a different view from the current block.

Figure 4:
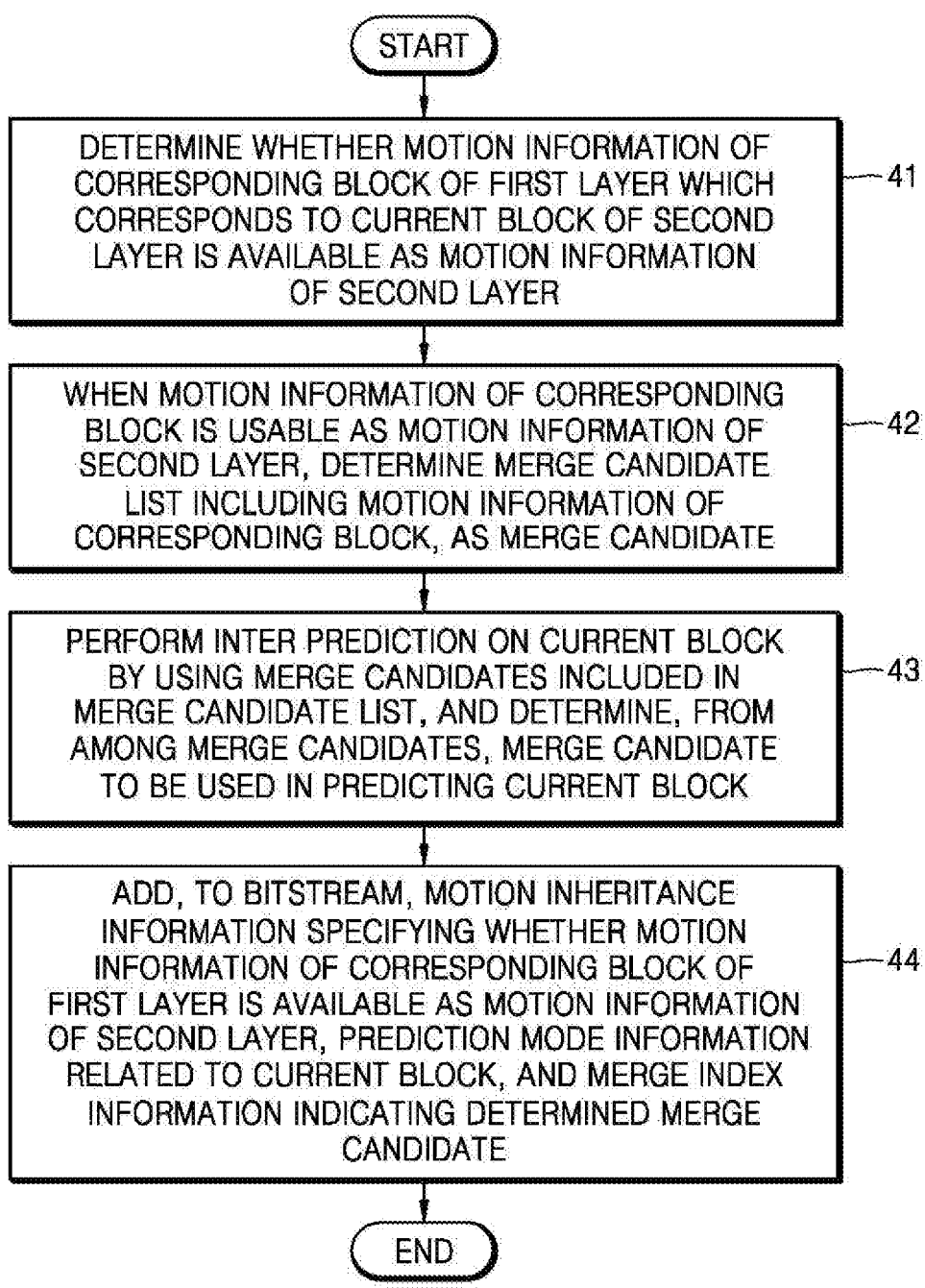
FIG. 4 is a flowchart for describing a multiview video encoding method, according to an embodiment.

FIG. 4 is a flowchart for describing a multiview video encoding method, according to an embodiment.

Referring to FIGS. 3 and 4, the inter predictor 33 according to an embodiment may determine whether to form a merge candidate by using a motion parameter inheritance candidate (hereinafter, referred to as the "MPI candidate") from among merge candidates, and may add, to a bitstream, information MPI_flag specifying whether the MPI candidate is used.

In more detail, in operation 41, the inter predictor 33 determines whether motion information of a corresponding block of a first layer which corresponds to a current block of a second layer is available as motion information of the second layer. For example, when the second layer is a depth image, and the first layer is a texture image corresponding to the depth image, the inter predictor 33 determines whether motion information of a corresponding block of the texture image is available so as to encode a current block of the depth image. The availability may specify whether the corresponding block of the texture image is encoded before the current block, is reconstructed, and then is available as reference information or whether the corresponding block of the texture image has motion information.

In operation 42, when the motion information of the corresponding block of the first layer is available as the motion information of the second layer, the inter predictor 33 determines a merge candidate list including, as a merge candidate, the motion information of the corresponding block of the first layer.

When the MPI candidate is used, the inter predictor 33 adds, in addition to the MPI candidate, an inter-view candidate, a spatial candidate, a disparity candidate, a temporal candidate, and a VSP candidate according to a predetermined priority order to the merge candidate list, and the adding process with respect to the merge candidate list is performed until the number of merge candidates included in the merge candidate list reaches a preset value of the maximum number of the merge candidates. Even if a process of obtaining the merge candidate list is performed, when the number of merge candidates included in the merge candidate list is less than the preset maximum number of the merge candidates, the inter predictor 33 may add a zero vector of (0,0) to the merge candidate list. Other merge candidates besides the MIP candidate may be selectively used. For example, the inter predictor 33 may determine whether or not to include the inter-view candidate in the merge candidates, and may signal use or non-use of inter-view prediction to a decoder. When a flag indicating use or non-use of the inter-view prediction is iv_mv_pred_flag, if iv_mv_pred_flag is 0, the inter-view candidate may be excluded when the merge candidate list is generated, and only when iv_mv_pred_flag is 1, the inter-view candidate may be used in generating the merge candidate list. As another example, the inter predictor 33 may determine whether or not to include the VSP candidate in the merge candidates, and may signal use or non-use of view synthesis prediction to the decoder. When a flag indicating use or non-use of the view synthesis prediction is view_synthesis_pred_flag, if view_synthesis_pred_flag is 0, the VSP candidate may be excluded when the merge candidate list is generated, and only when view_synthesis_pred_flag is 1, the VSP candidate may be used in generating the merge candidate list.

When the MPI candidate is not used, the inter predictor 33 adds, excluding the MPI candidate, the inter-view candidate, the spatial candidate, the disparity candidate, the temporal candidate, and the VSP candidate according to the predetermined priority order to the merge candidate list, and the adding process with respect to the merge candidate list is performed until the number of merge candidates included in the merge candidate list reaches the preset value of the maximum number of the merge candidates. Even if the process of obtaining the merge candidate list is performed, when the number of merge candidates included in the merge candidate list is less than the preset maximum number of the merge candidates, the inter predictor 33 may add the zero vector of (0,0) to the merge candidate list.

When the merge candidate list is formed as described above, in operation 43, the inter predictor 33 performs inter prediction on a current block by using the merge candidates included in the merge candidate list, and determines, from among the merge candidates, a merge candidate to be used in predicting the current block. The inter predictor 33 determines, as an optimal merge candidate, the merge candidate having a minimum rate distortion (RD) cost, adds merge indexes to the merge candidates, respectively, according to an order of adding the merge candidates to the merge candidate list, and outputs a merge index indicating the determined optimal merge candidate.

In operation 44, the output unit 34 adds, to a bitstream, motion inheritance information specifying whether the motion information of the corresponding block of the first layer is available as the motion information of the second layer, i.e., MPI_flag indicating use or non-use of the MPI candidate, prediction mode information related to the current block, and merge index information indicating the determined merge candidate, and outputs the bitstream. The motion inheritance information (i.e., MPI_flag) may be included in a video parameter set (VPS) that is a group of parameters applied to all sequences of the multiview video, a picture parameter set (PPS) that is a group of parameters applied to a picture unit, or a slice.

In order to decode the current block encoded in a merge mode as described above, an encoder and a decoder have to form a same merge candidate list. When the merge candidate list is formed, if the number of merge candidates included in the merge candidate list is less than the preset maximum number of the merge candidates, the merge candidates are sequentially included in the merge candidate list according to a predetermined priority order. Therefore, the encoder and the decoder have to set a same maximum number of merge candidates that may be included in the merge candidate list. When the MPI candidate is selectively usable, if the MPI candidate is included in the merge candidates, the preset maximum number of the merge candidates has to be increased by 1. That is, when the preset maximum number of the merge candidates excluding the MPI candidate is max_num_merge_cand, if the MPI candidate is included in the merge candidates, the maximum number of the candidates is (max_num_merge_cand+1) to which 1 is added. When the motion inheritance information specifying use or non-use of the MPI candidate is MPI_flag, if it is assumed that the MPI candidate is used, MPI_flag has a value of 1, and if the MPI candidate is not used, MPI_flag has a value of 0, a maximum number of the merge candidates according to whether or not the MPI candidate is included is (max_num_merge_cand+MPI_flag). In order to decrease an amount of transmission-target data of max_num_merge_cand that is the preset maximum number of the merge candidates, 5-max_num_merge_cand that is a value obtained by subtracting max_num_merge_cand that is the preset maximum number of the merge candidates from a predetermined value, e.g., 5, is defined as five_minus_max_num_merge_cand. In this case, when five_minus_max_num_merge_cand is added to the bitstream and thus is transmitted to the decoder, the decoder may obtain, via (5+five_minus_max_num_merge_cand), max_num_merge_cand that is the preset maximum number of the merge candidates.

An available merge candidate may be limited according to a type of a current image. For example, it is assumed that, in a depth image, the MPI candidate is selectively usable but the inter-view candidate is not used, and in a texture image, the MPI candidate is not used but the inter-view candidate is selectively usable. It is assumed that a flag indicating use or non-use of the inter-view prediction is iv_mv_pred_flag, and when iv_mv_pred_flag is 0, the inter-view candidate is excluded when the merge candidate list is generated, and only when iv_mv_pred_flag is 1, the inter-view candidate may be used in generating the merge candidate list. In this case, the number of merge candidates to be added to max_num_merge_cand that is the preset maximum number of the merge candidates corresponds to (iv_mv_pred_flag// MPI_flag). "//" is an OR operator, when any one of iv_mv_pred_flag and MPI_flag is 1, a value of (iv_mv_pred_flag//MPI_flag) is 1, and when all of iv_mv_pred_flag and MPI_flag is 0, the value of (iv_mv_pred_flag// MPI_flag) is 0. That is, when the MPI candidate and the inter-view candidate are selectively used, the maximum number of merge candidates in forming a merge candidate list of the texture image and the depth image may have a value increased by 1, compared to the preset maximum number of the merge candidates. As described above, when the value obtained by subtracting a value of 5 from the preset maximum number of the merge candidates is five_minus_max_num_merge_cand, the maximum number of the merge candidates corresponds to (5-five_minus_max_num_merge_cand)+(iv_mv_pred_flag//MPI_flag).

As another example, it is assumed that, in the depth image, the MPI candidate is selectively usable but the inter-view candidate and the VSP candidate are not used, and in the texture image, the MPI candidate is not used but the inter-view candidate and the VSP candidate are selectively usable. It is assumed that the flag indicating use or non-use of the inter-view prediction is iv_mv_pred_flag, and when iv_mv_pred_flag is 0, the inter-view candidate is excluded when the merge candidate list is generated, and only when iv_mv_pred_flag is 1, the inter-view candidate may be used in generating the merge candidate list. In addition, it is assumed that a flag indicating use or non-use of view synthesis prediction is view_synthesis_pred_flag, and when view_synthesis_pred_flag is 0, the VSP candidate is excluded when the merge candidate list is generated, and only when view_synthesis_pred_flag is 1, the VSP candidate may be used in generating the merge candidate list. In this case, the number of merge candidates to be added to max_num_merge_cand that is the preset maximum number of the merge candidates corresponds to (iv_mv_pred_flag// view_synthesis_pred_flag//MPI_flag). "//" is an OR operator, when any one of iv_mv_pred_flag, view_synthesis_pred_flag, and MPI_flag is 1, a value of (iv_mv_pred_flag//view_synthesis_pred_flag//MPI_flag) is 1, and when all of iv_mv_pred_flag, view_synthesis_pred_flag, and MPI_flag is 0, the value of (iv_mv_pred_flag// view_synthesis_pred_flag//MPI_flag) is 0. That is, when the MPI candidate, the VSP candidate, and the inter-view candidate are selectively used, the maximum number of merge candidates in forming a merge candidate list of the texture image and the depth image may have a value increased by 1, compared to the preset maximum number of the merge candidates. As described above, when the value obtained by subtracting the value of 5 from the preset maximum number of the merge candidates is five_minus_max_num_merge_cand, the maximum number of the merge candidates corresponds to (5-five_minus_max_num_merge_cand)+ (iv_mv_pred_flag//view_synthesis_pred_flag//MPI_flag).

When the preset maximum number of the merge candidates is 5 and the MPI candidate is used, the inter predictor 33 increases the preset maximum number of the merge candidates by 1 and includes the merge candidates in the merge candidate list according to the predetermined priority order until six merge candidates are included in the merge candidate list. Also, when the MPI candidate is not used, the inter predictor 33 includes the merge candidates in the merge candidate list according to the predetermined priority order until five merge candidates that correspond to the preset maximum number of the merge candidates are included in the merge candidate list. As described above, an order and types of the merge candidates to be included in the merge candidate list may be changed.

Figure 5:
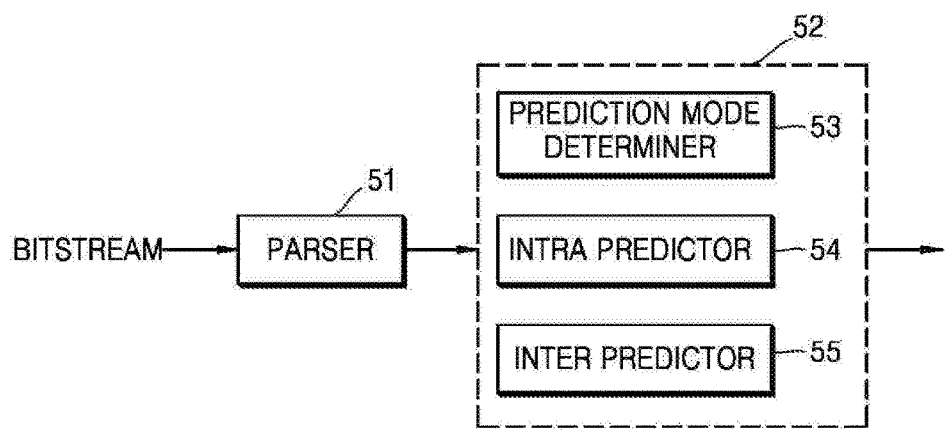
FIG. 5 is a block diagram of a multiview video decoding apparatus, according to an embodiment.

FIG. 5 is a block diagram of a multiview video decoding apparatus, according to an embodiment.

Referring to FIG. 5, the multiview video decoding apparatus includes a parser 51 and a multiview video decoder 52.

The parser 51 parses a plurality of pieces of encoded syntax information of a multiview video from a bitstream and outputs them. In more detail, the parser 51 obtains, from the bitstream, prediction mode information related to a current block of a second layer, motion inheritance information (i.e., MPI_flag) specifying whether or not motion information of a corresponding block of a first layer which corresponds to the current block is available as motion information of the second layer, merge index information indicating a merge candidate that is from among merge candidates included in a merge candidate list and is to be used in predicting the current block.

The multiview video decoder 52 performs decoding by using the syntaxes parsed from the bitstream. A prediction mode determiner 53 determines, based on the prediction mode information related to the current block, in which prediction mode from among intra prediction and inter prediction the current block is decoded.

When the block was encoded according to an intra prediction mode, an intra predictor 54 obtains, from the bitstream, information related to the intra prediction mode used in the intra prediction, generates a prediction block of the current block according to the obtained intra prediction mode, adds, to the prediction block, a residual signal obtained from the bitstream, and thus reconstructs the current block. As described above, the current block that was intra predicted according to HEVC may be decoded according to one intra prediction mode from among a total of 35 intra prediction modes including the DC mode, the planar mode, and the direction modes having 33 directions.

The inter predictor 55 obtains the prediction block of the current block from a reference picture. In a case where the prediction mode of the current block is a merge mode, and the motion inheritance information specifies that the motion information of the first layer is available as the motion information of the second layer, the inter predictor 55 obtains a merge candidate list including, as a merge candidate, the motion information of the corresponding block of the first layer, and determines, based in the merge index information, one merge candidate from among merge candidates included in the merge candidate list. For example, in a case where a prediction mode of a current block of a depth image is a merge mode, a value of motion inheritance information (i.e., MPI_flag) is 1, and the motion inheritance information (i.e., MPI_flag) specifies that motion information of a corresponding texture image can be changelessly used as motion information of the depth image, the inter predictor 55 uses motion information of a corresponding block of the texture image which corresponds to the current block, as motion information of the current block. A corresponding block relationship may represent blocks that are located at positions equal to each other. For example, a block of the texture image which corresponds to the current block of the depth image indicates a block at a same position as the current block in the texture image. Motion information may include information about a reference picture list including a list 0, a list 1, etc., index information (i.e., ref idx) indicating a reference picture that is from among reference pictures included in the reference picture list and was used in inter predicting the current block, and information about a motion vector of the current block.

With respect to the current block that was encoded in a merge skip mode, the current block may be reconstructed by using motion information of a merge candidate in the merge candidate list, wherein the merge candidate is indicated by index information (merge index) from which the motion information is to be obtained. In the merge mode, the prediction block of the current block may be obtained by using the motion information of the merge candidate determined due to the merge candidate index, and the current block may be reconstructed by adding, to the prediction block, the residual signal obtained from the bitstream.

Equally as in the encoder, the inter predictor 55 may include, as merge candidates used in the merge mode, (1) a MPI candidate, (2) an inter-view candidate, (3) a spatial candidate, (4) a disparity candidate, (5) a temporal candidate, and (6) a VSP candidate. As described above, use or non-use of each merge candidate may be signalled via separate flag information. In particular, according to an embodiment of the present invention, use or non-use of the MPI candidate may be determined based on a flag (i.e., MPI_flag) included in a VPS, a PPS, and a slice header.

Figure 6:
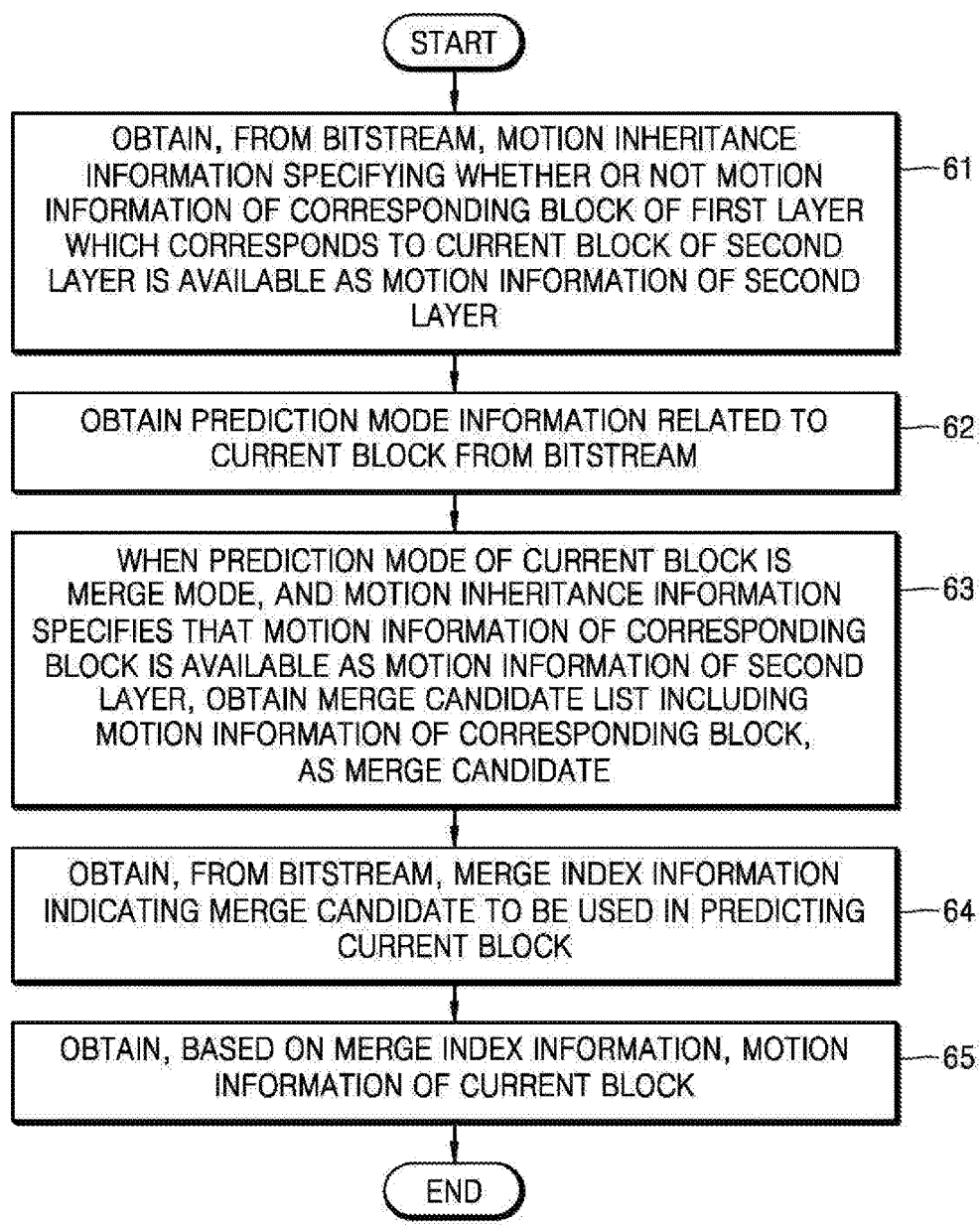
FIG. 6 is a flowchart for describing a multiview video decoding method, according to an embodiment.

FIG. 6 is a flowchart for describing a multiview video decoding method, according to an embodiment.

Referring to FIGS. 5 and 6, in operation 61, the parser 51 obtains, from a bitstream, motion inheritance information (i.e., MPI_flag) specifying whether or not motion information of a corresponding block of a first layer which corresponds to a current block of a second layer is available as motion information of the second layer.

For example, when the first layer is a depth image, and the second layer is a texture image corresponding to the depth image, it may be determined, based on the motion inheritance information (i.e., MPI_flag), whether or not motion information of a corresponding block of the texture image is available so as to decode a current block of the depth image.

In operation 62, the parser 51 may output prediction mode information related to the current block from the bitstream, and the prediction mode determiner 53 may determine a prediction mode of the current block, based on the prediction mode information.

In operation 63, when the prediction mode of the current block is a merge mode, and the motion inheritance information (i.e., MPI_flag) specifies that the motion information of the corresponding block of the first layer is available as the motion information of the second layer, the inter predictor 55 obtains a merge candidate list including, as a merge candidate, the motion information of the corresponding block of the first layer.

When the MPI candidate is used, the inter predictor 55 adds, in addition to the MPI candidate, an inter-view candidate, a spatial candidate, a disparity candidate, a temporal candidate, and a VSP candidate according to a predetermined priority order to the merge candidate list, and the adding process with respect to the merge candidate list is performed until the number of merge candidates included in the merge candidate list reaches a preset value of the maximum number of the merge candidates. Even if a process of obtaining the merge candidate list is performed, when the number of merge candidates included in the merge candidate list is less than the preset maximum number of the merge candidates, the inter predictor 55 may add a zero vector of (0,0) to the merge candidate list. Other merge candidates besides the MIP candidate may be selectively used. For example, when a flag (iv_mv_pred_flag) indicating use or non-use of inter-view prediction is 0, the inter predictor 55 may exclude the inter-view candidate when the merge candidate list is generated, and only when iv_mv_pred_flag is 1, the inter predictor 55 may use the inter-view candidate when the merge candidate list is generated. As another example, when a flag (view_synthesis_pred_flag) indicating use or non-use of view synthesis prediction is 0, the inter predictor 55 may exclude the VSP candidate when the merge candidate list is generated, and only when view_synthesis_pred_flag is 1, the inter predictor 55 may use the VSP candidate when the merge candidate list is generated.

When the MPI candidate is not used, the inter predictor 55 adds, excluding the MPI candidate, the inter-view candidate, the spatial candidate, the disparity candidate, the temporal candidate, and the VSP candidate according to the predetermined priority order to the merge candidate list, and the adding process with respect to the merge candidate list is performed until the number of merge candidates included in the merge candidate list reaches the preset value of the maximum number of the merge candidates. Even if the process of obtaining the merge candidate list is performed, when the number of merge candidates included in the merge candidate list is less than the preset maximum number of the merge candidates, the inter predictor 55 may add the zero vector of (0,0) to the merge candidate list.

When the merge candidate list is formed, if the number of merge candidates included in the merge candidate list is less than the preset maximum number of the merge candidates, the merge candidates are sequentially included in the merge candidate list according to a predetermined priority order. When the MPI candidate is selectively usable, if the MPI candidate is included in the merge candidates, the preset maximum number of the merge candidates has to be increased by 1. That is, when the preset maximum number of the merge candidates excluding the MPI candidate is max_num_merge_cand, if the MPI candidate is included in the merge candidates, the maximum number of the candidates is (max_num_merge_cand+1) to which 1 is added. That is, a maximum number of the merge candidates according to whether or not the MPI candidate is included is (max_num_merge_cand+MPI_flag). Instead of max_num_merge_cand that is the preset maximum number of the merge candidate, when five_minus_max_num_merge_cand is used so as to indicate a preset maximum number of the merge candidates, wherein five_minus_max_num_merge_cand is a value obtained by subtracting, from 5, max_num_merge_cand that is the preset maximum number of the merge candidates, max_num_merge_cand that is the preset maximum number of the merge candidates may be obtained via (5+five_minus_max_num_merge_cand).

An available merge candidate may be limited according to a type of a current image. For example, it is assumed that, in a depth image, the MPI candidate is selectively usable but the inter-view candidate is not used, and in a texture image, the MPI candidate is not used but the inter-view candidate is selectively usable. It is assumed that a flag indicating use or non-use of the inter-view prediction is iv_mv_pred_flag, and when iv_mv_pred_flag is 0, the inter-view candidate is excluded when the merge candidate list is generated, and only when iv_mv_pred_flag is 1, the inter-view candidate can be used in generating the merge candidate list. In this case, the number of merge candidates to be added to max_num_merge_cand that is the preset maximum number of the merge candidates corresponds to (iv_mv_pred_flag//

MPI_flag). "//" is an OR operator, when any one of iv_mv_pred_flag and MPI_flag is 1, a value of (iv_mv_pred_flag//MPI_flag) is 1, and when all of iv_mv_pred_flag and MPI_flag is 0, the value of (iv_mv_pred_flag//MPI_flag) is 0. That is, when the MPI candidate and the inter-view candidate are selectively used, the maximum number of merge candidates in forming a merge candidate list of the texture image and the depth image may have a value increased by 1, compared to the preset maximum number of the merge candidates. As described above, when the value obtained by subtracting a value of 5 from the preset maximum number of the merge candidates is five_minus_max_num_merge_cand, the maximum number of the merge candidates corresponds to (5-five_minus_max_num_merge_cand)+(iv_mv_pred_flag//MPI_flag).

As another example, it is assumed that, in the depth image, the MPI candidate is selectively usable but the inter-view candidate and the VSP candidate are not used, and in the texture image, the MPI candidate is not used but the inter-view candidate or the VSP candidate is selectively usable. It is assumed that the flag indicating use or non-use of the inter-view prediction is iv_mv_pred_flag, and when iv_mv_pred_flag is 0, the inter-view candidate is excluded when the merge candidate list is generated, and only when iv_mv_pred_flag is 1, the inter-view candidate can be used in generating the merge candidate list. In addition, it is assumed that a flag indicating use or non-use of view synthesis prediction is view_synthesis_pred_flag, and when view_synthesis_pred_flag is 0, the VSP candidate is excluded when the merge candidate list is generated, and only when view_synthesis_pred_flag is 1, the VSP candidate can be used in generating the merge candidate list. In this case, the number of merge candidates to be added to max_num_merge_cand that is the preset maximum number of the merge candidates corresponds to (iv_mv_pred_flag//view_synthesis_pred_flag//MPI_flag). "//" is an OR operator, when any one of iv_mv_pred_flag, view_synthesis_pred_flag, and MPI_flag is 1, a value of (iv_mv_pred_flag//view_synthesis_pred_flag//MPI_flag) is 1, and when all of iv_mv_pred_flag, view_synthesis_pred_flag, and MPI_flag is 0, the value of (iv_mv_pred_flag//view_synthesis_pred_flag//MPI_flag) is 0. That is, when the MPI candidate, the VSP candidate, and the inter-view candidate are selectively used, the maximum number of merge candidates in forming a merge candidate list of the texture image and the depth image may have a value increased by 1, compared to the preset maximum number of the merge candidates. As described above, when the value obtained by subtracting the value of 5 from the preset maximum number of the merge candidates is five_minus_max_num_merge_cand, the maximum number of the merge candidates corresponds to (5-five_minus_max_num_merge_cand)+(iv_mv_pred_flag//view synthesis_pred_flag//MPI_flag).

When the preset maximum number of the merge candidates is 5 and the MPI candidate is used, the inter predictor 33 increases the preset maximum number of the merge candidates by 1 and includes the merge candidates in the merge candidate list according to the predetermined priority order until six merge candidates are included in the merge candidate list. Also, when the MPI candidate is not used, the inter predictor 33 includes the merge candidates in the merge candidate list according to the predetermined priority order until five merge candidates that correspond to the preset maximum number of the merge candidates are included in the merge candidate list. As described above, an order and types of the merge candidates to be included in the merge candidate list may be changed. However, orders and types of the merge candidates to be included in the merge candidate list are set to be equal at the encoder and the decoder.

In operation 64, the inter predictor 55 obtains, from the bitstream, merge index information indicating a merge candidate that is from among the merge candidates included in the merge candidate list and is to be used in predicting the current block.

In operation 65, the inter predictor 55 determines, based on the merge index information, one merge candidate from among the merge candidates included in the merge candidate list, and obtains motion information of the current block by using motion information of the merge candidate. As described above, the motion information includes a direction of a reference picture, a reference picture index, and a prediction value of a motion vector.

Hereinafter, a technique of efficiently encoding and decoding a multiview video by using correlation between pictures of each of layers that construct the multiview video is described.

Figure 7:
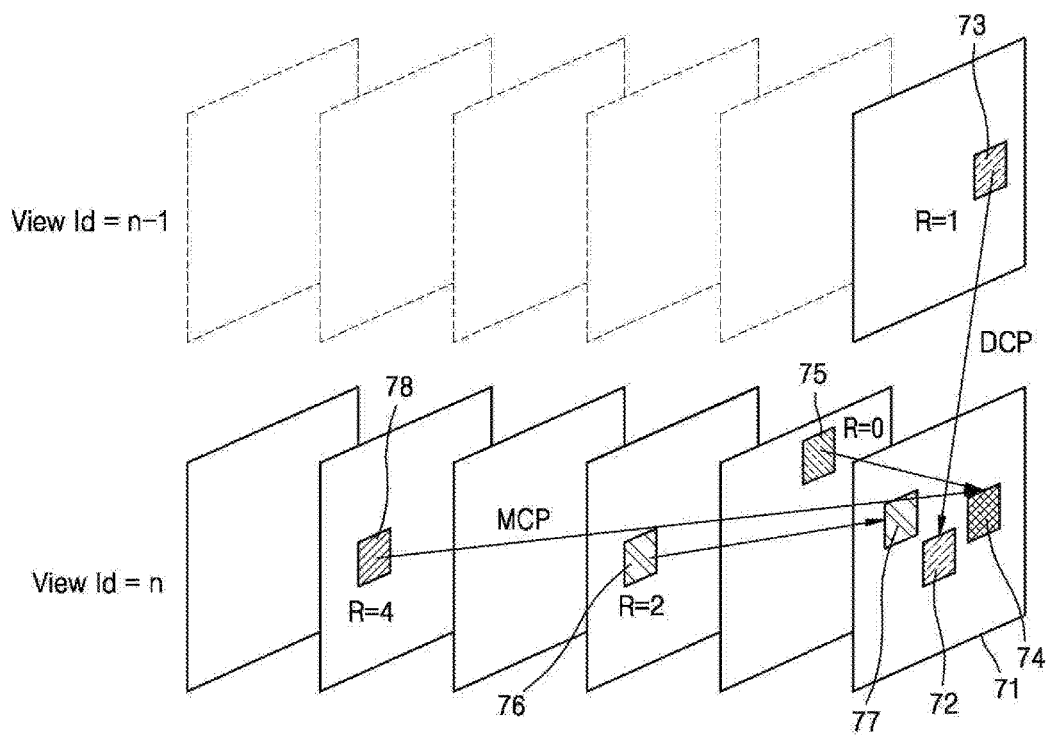
FIG. 7 is a diagram for describing a disparity compensation prediction technique, according to an embodiment.

FIG. 7 is a diagram for describing a disparity compensation prediction technique, according to an embodiment.

When a multiview video is encoded/decoded, besides motion compensation prediction (MCP) using a reference picture at a same view and a different time, inter prediction using disparity compensation prediction (DCP) that uses a view-direction reference picture input at a different view and a same time may be performed. Referring to FIG. 7, blocks included in a current picture 71 at a current view whose view identifier viewed is n may be predicted according to MCP using blocks of a reference picture at a same view n. In FIG. 7, a block 74 of a current picture 71, which is bi-directionally predicted, is motion compensation predicted in bi-directions by using reference blocks 75 and 76 of reference pictures which are indicated by 0 and 4 that are values of reference picture indexes R, and a block 77 that is uni-directionally predicted is motion compensation predicted in a single direction by using the reference block 76 of the reference picture in which the reference picture index R has a value of 2. A block 72 of the current picture 71 may be predicted according to DCP that uses a reference block 73 of a reference picture input at a same time and a different view (ViewId=n−1). The reference block 73 of the reference picture at the different view may be determined by using a disparity vector. A disparity vector of the block 72 that was predicted by using the reference block at the different view may be predicted may be predicted by using a motion vector of a neighbouring block that is from among neighbouring blocks and refers to the reference picture at the different view. That is, in the multiview video, a prediction motion vector of a block predicted according to MCP may be predicted by using a motion vector of a neighbouring block predicted according to MCP, from among neighbouring blocks, and a prediction motion vector of a block predicted according to DCP may be predicted by using a motion vector of a neighbouring block predicted according to DCP, from among neighbouring blocks.

As such, a disparity vector is used in determining a block that corresponds to a current block and is from a picture that was input at a different view and a same time as a current picture and was previously encoded/decoded. The disparity vector may be obtained from motion vectors of a neighbouring block of the current block which is predicted according to inter-view prediction or of a corresponding block temporally associated with the current block, or may be obtained motion vectors obtained by directly performing inter-view prediction on the current block.

Hereinafter, a process of obtaining a disparity vector is described with reference to FIGS. 8 through 10.

Figure 8:
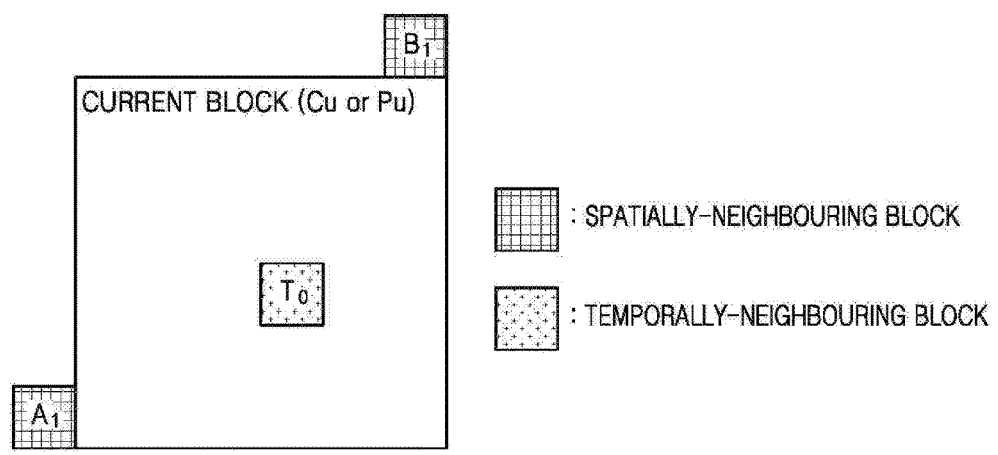
FIG. 8 is a diagram for describing a process of obtaining a disparity vector from neighbouring blocks associated with a current block, according to an embodiment.

FIG. 8 is a diagram for describing a process of obtaining a disparity vector from neighbouring blocks associated with a current block, according to an embodiment.

Referring to FIG. 8, a disparity vector of a current block may be obtained from neighbouring blocks that are spatially and temporally associated with a current block. Here, the current block may be a coding unit CU or a prediction unit PU according to HEVC. A disparity vector may be obtained from, as spatially-associated neighbouring blocks, an A1 block positioned at a lower left side of the current block and a B1 block positioned an upper right side. In order to obtain the disparity vector, it is checked, in an order of the A1 block and the B1 block, whether they have the disparity vector, one of the A1 block and the B1 block has the disparity vector, a disparity vector of the current block may be obtained by using the corresponding disparity vector.

The disparity vector of the current block may be obtained by using a temporally-neighbouring block T0 that is from among blocks of a reference picture and is at a same position as the current block. Two reference pictures may be used as the reference picture that is temporally associated with a current picture. A first reference picture from among the two reference pictures may be determined as a reference picture that is signalled according to reference picture information of a slice header. When a random access point (RAP) picture is included in reference pictures included in a reference picture list, a second reference picture may be determined as the RAP picture. If the RAP picture is not present in the reference picture list, a reference picture from among the reference pictures in the reference picture list, which has a lowest temporal identifier, may be determined as the second reference picture. If a plurality of reference pictures each having a lowest temporal identifier are present, a reference picture having a smallest POC with respect to the current picture may be determined as the second reference picture. A motion vector of a collocated block of the second reference picture may be used in determining the disparity vector of the current block.

As illustrated in FIG. 8, the disparity vector may be obtained from neighbouring blocks by using MCP, besides from the neighbouring block, according to DCP, which has the disparity vector and is from among the neighbouring blocks that are temporally and spatially associated with the current block.

Figure 9:
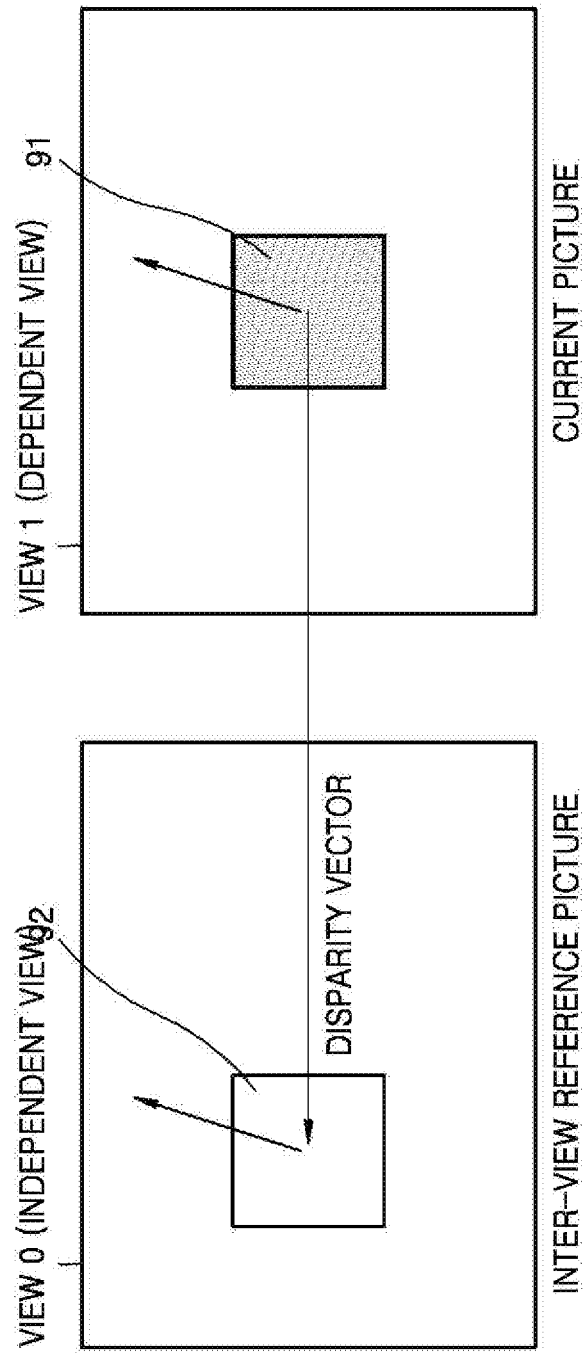
FIG. 9 illustrates an example of a process of obtaining a disparity vector from a neighbouring block that is motion compensation predicted, according to an embodiment.

FIG. 9 illustrates an example of a process of obtaining a disparity vector from a neighbouring block that is motion compensation predicted, according to an embodiment.

Referring to FIG. 9, a neighbouring block 91 associated with a current block is a block that is predicted according to MCP, and when a motion vector of the neighbouring block 91 is predicted according to inter-view motion prediction indicating a corresponding block 92 at a different view, a disparity vector used in the inter-view motion prediction with respect to the neighbouring block 91 represents a motion correspondence relationship between a current view and an inter-view reference picture. Therefore, a disparity vector of the current block may be determined by using the motion vector of the neighbouring block 91 which is predicted according to inter-view motion prediction.

Figure 10:
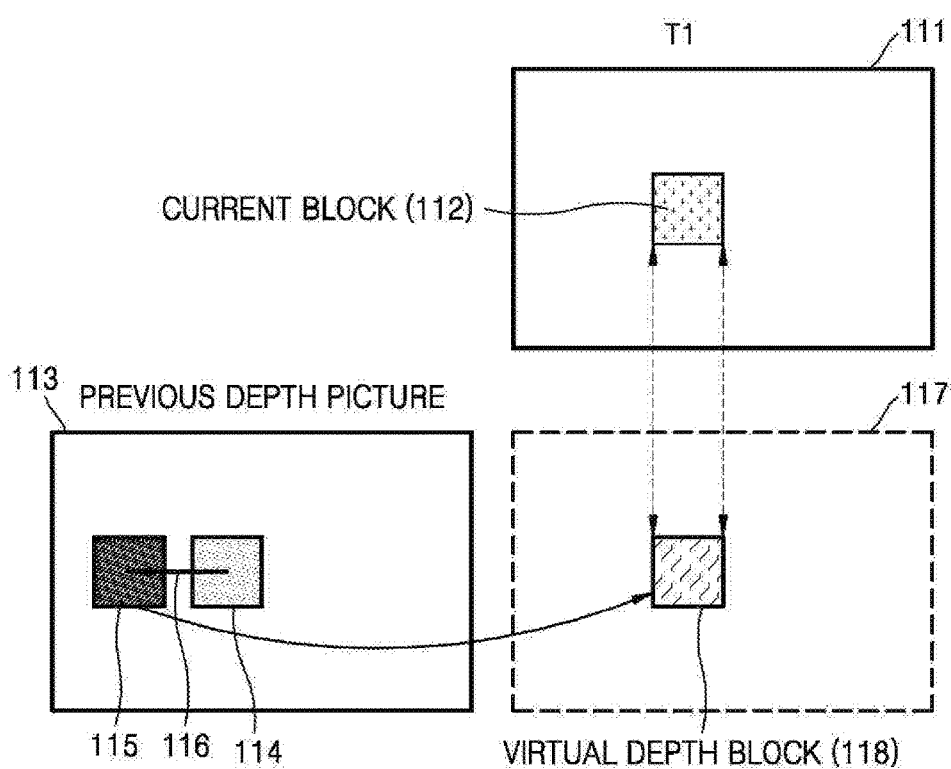
FIG. 10 illustrates an example of a process of obtaining a disparity vector from a depth image, according to an embodiment.

FIG. 10 illustrates an example of a process of obtaining a disparity vector from a depth image, according to an embodiment.

After a texture image and a depth image of an independent layer are encoded/decoded, a texture image and a depth image of a dependent layer are encoded/decoded. Therefore, when the dependent layer is encoded/decoded, the depth image of the independent layer was previously processed and thus is available.

Therefore, in order to determine a disparity vector of a current block 112 included in a texture image T1 111 of a dependent layer, a disparity vector 116 may be determined, based on the disparity vector generation technique described above with reference to FIG. 8, with respect to a collocated block 114 of a depth image D0 113 of a previous independent layer, wherein the collocated block 114 is at a same position as the current block 112. The disparity vector 116 of the collocated block 114 represents a positional difference between the collocated block 114 and a corresponding block 115. By using the disparity vector 116, a virtual depth block 118 corresponding to the current block 112 may be determined from a depth image 117 at a same view which corresponds to the current block 112.

Hereinafter, (1) a MPI candidate, (2) an inter-view candidate, (3) a spatial candidate, (4) a disparity candidate, (5) a temporal candidate, and (6) a VSP candidate that may be included as merge candidates in a merge candidate list are described.

Figure 11A:
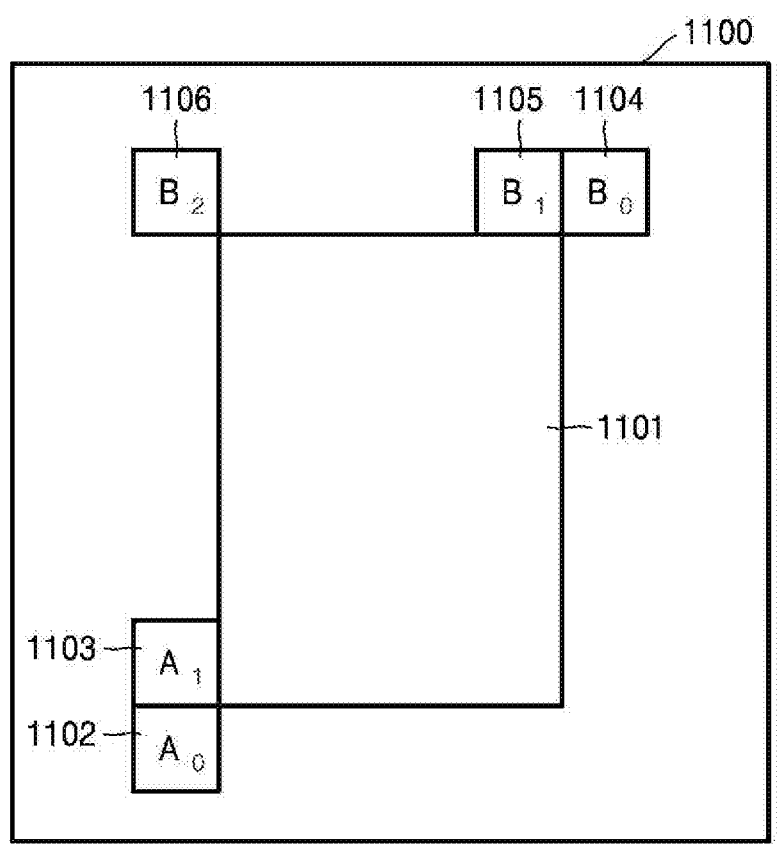
FIG. 11A illustrates a spatial candidate included in a merge candidate list, according to an embodiment.

FIG. 11A illustrates a spatial candidate included in a merge candidate list, according to an embodiment.

Referring to FIG. 11A, a lower left block $A_0$ 1102 of a current block 1101, a block $A_1$ 1103 upwardly adjacent to the lower left block, an upper right block $B_0$ 1104 of the current block, a block $B_1$ 1105 adjacent left to the upper right block, and an upper left block $B_2$ 1106 of the current block may be used as spatial merge candidates. When the merge candidate list is formed, blocks are searched in an order of $A_1$ 1103, $B_1$ 1105, $B_0$ 1104, $A_0$ 1102, and $B_2$ 1106, so that neighboring blocks having motion information may be sequentially included in the merge candidate list. If a neighboring block corresponds to a frame boundary, or is intra predicted and thus does not include motion information, the neighboring block is not included in the merge candidate list. Positions of neighboring blocks, the number of the neighboring blocks, and a search order with respect to the neighboring blocks that may be included in the merge candidate list are not limited to the present embodiment and thus may vary. The current block may be a coding unit or a prediction unit according to HEVC.

Figure 11B:
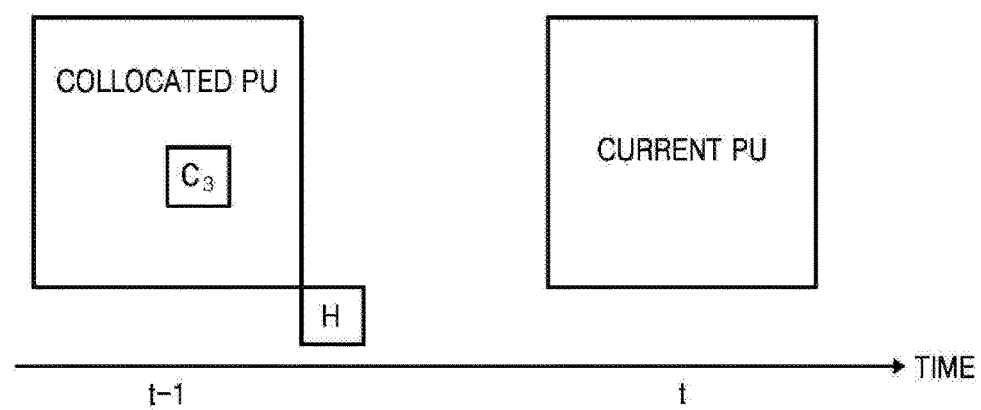
FIG. 11B illustrates a temporal candidate included in a merge candidate list, according to an embodiment.

FIG. 11B illustrates a temporal candidate included in a merge candidate list, according to an embodiment.

A direction and a reference picture index of a reference picture for a temporal merge candidate may be transmitted to a decoder (decoding apparatus) via a slice header. FIG. 11B illustrates a selection location of a temporal merge candidate of a current prediction unit (PU). A PU at the same location corresponds to a PU at a location corresponding to a location of the current PU, in a selected reference picture. The temporal merge candidate first searches for a lower right block H of the PU at the same location, and if motion information of the lower right block H does not exist, a block including a pixel of a center $C_3$ of the PU at the same location is searched for.

Next, the inter-view candidate and the disparity candidate will now be described.

A compression performance of multiview video encoding may be derived by removing spatial redundancy by using an inter-view prediction method. Images of one object captured at different views have high mutual similarity when a region hidden or exposed by moving a camera is excluded. A method of finding and encoding a region most similar to a current block from an image at a different view by using such inter-view similarity is referred to as disparity-compensated prediction. Also, a motion vector used for the disparity-compensated prediction is referred to as a disparity vector to be distinguished from a general temporal motion vector.

A multiview image having high inter-view correlation may be efficiently encoded by predicting and using an encoding parameter of a neighbouring view which was previously encoded. To do so, an inter-view encoding parameter predicting method is used. A representative example of the inter-view encoding parameter predicting method includes an inter-view motion vector predicting method. Since the multiview image is obtained by capturing one object at different views, the multiview image has very similar motion characteristics excluding a region hidden or exposed according to view movement. When a dependent layer image is encoded by using the characteristics, a motion vector of a current block may be predicted from a motion vector at a neighbouring view which is previously encoded and decoded, so that encoding efficiency may be increased.

Figure 12:
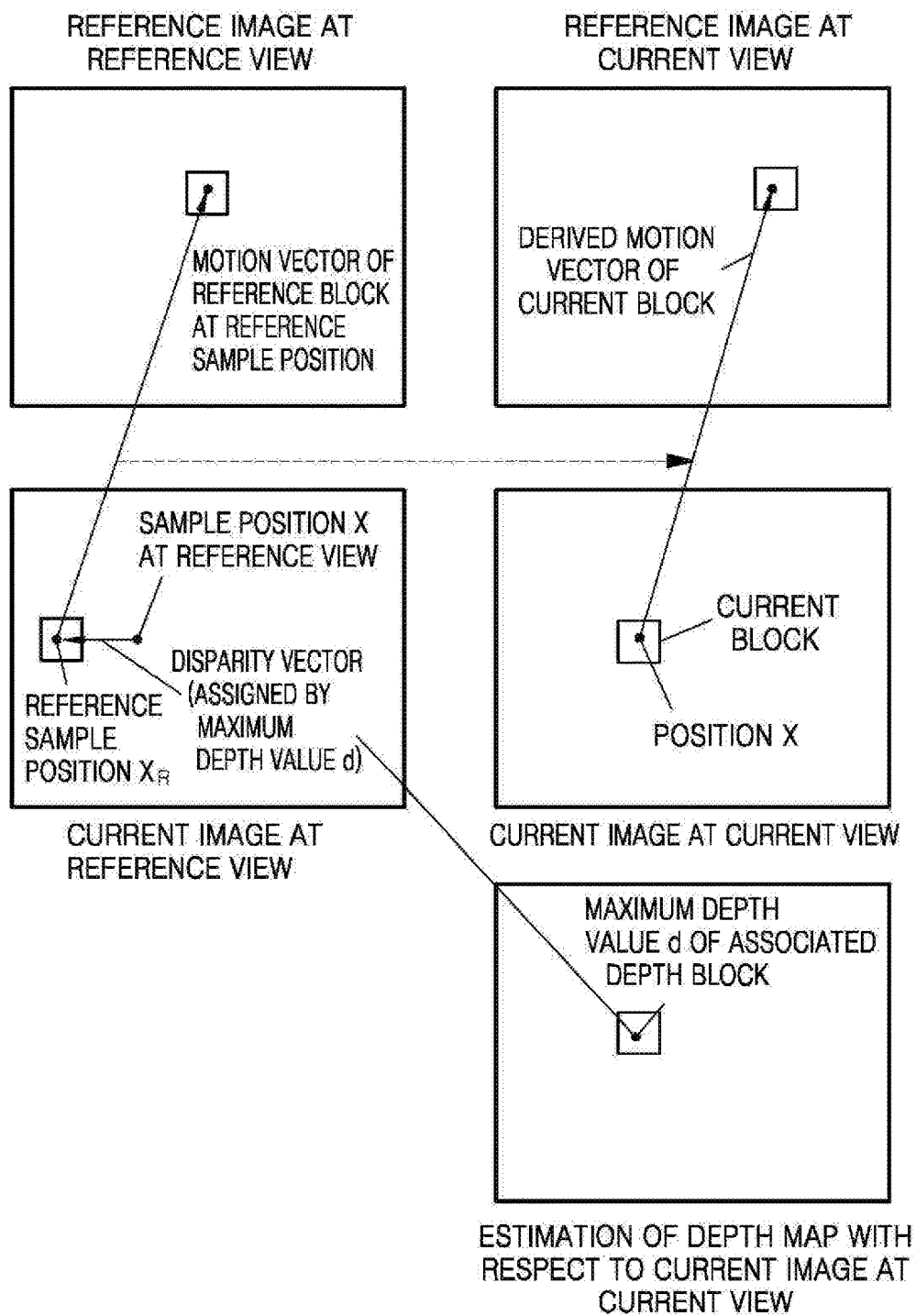
FIG. 12 illustrates an inter-view candidate and a disparity candidate, according to an embodiment of the present invention.

FIG. 12 illustrates an inter-view candidate and a disparity candidate, according to an embodiment of the present invention.

Referring to FIG. 12, motion information of a reference view that is previously encoded may be used as motion information of a current view. In more detail, in order to determine a disparity vector of a position X of a current block, a depth image with respect to a current image at the current view is estimated, so that a maximum depth value d of a depth block associated with the position of the current block is obtained. Then, the disparity vector may be obtained by using the obtained maximum depth value d. When the disparity vector of the position X of the current block is obtained, a reference sample position $X_R$ may be determined in a current image at the reference view. A block of the current image at the reference view which includes the reference sample position $X_R$ is a corresponding block that corresponds to the current block of the current image at the current view. When the corresponding block has a motion vector that refers to a reference image at the reference view, the motion vector of the corresponding block may be used as a motion vector predictor of the current block. Therefore, information about the motion vector of the corresponding block may be used as the inter-view candidate.

The disparity candidate is to be used in predicting a current block by using a disparity vector as a motion vector. With reference to FIG. 12, when the current image at the reference view where the corresponding block is located is included in a reference picture list, the disparity vector may be used in predicting the current block by using the disparity vector as the motion vector. That is, information about the disparity vector may be used as the disparity candidate.

In order to predict an inter-view motion vector, a motion vector at a position in a neighbouring view, the position corresponds to a current block, needs to be predicted. At this time, the inter-view motion vector may be further accurately predicted by predicting the inter-view motion vector at a position away from current coordinates in a reference view image by a disparity, and a disparity for predicting the motion vector from the neighboring view may be derived from an adjacent encoded block. Also, when an encoding target block is encoded by an inter-view motion vector, disparity information used in the encoding may be stored, so that disparity information may be provided to another block to be encoded later.

Next, a VSP candidate will now be described.

Since inter-view correlation is very high in the multiview video, a view image to be encoded may be synthesized by using a color image and a depth image at a previous view. The image synthesized by using the color image and the depth image at the previous view is referred to as a view synthesis frame. The VSP candidate indicates a block in the view synthesis frame, which is located at a same position as the current block. In addition, a shift disparity vector obtained by shifting a disparity vector by a size of the current block may be included in the merge candidates.

Inter-view motion vectors may correspond to a value scaled according to a difference value between view order indexes of a current picture and a reference picture referred to by the current block, and a difference value between view order indexes of a collocated reference picture and a reference picture referred to by the collocated reference picture. For example, it is assumed that "tb" is a value obtained by clipping a difference value (CurrViewOrderIdx−CurrRefViewOrderIdx) between a view order (CurrViewOrderIdx) of a current picture and a view order (CurrRefViewOrderIdx) of a reference picture referred to by the current picture, and "td" is a value obtained by clipping a difference value (ColViewOrderIdx−ColViewOrderIdx) between a view order index (ColViewOrderIdx) of a collocated reference picture and a view order index (ColRefViewOrderIdx) of a reference picture referred to by the collocated reference picture, where td=clip3(−128, 127, ColViewOrderIdx−ColViewOrderIdx).

Also, it is assumed that tx=(16384+Abs(td/2))/td. In this case, the inter-view motion vectors are scaled by multiplying the inter-view motion vectors by DistScaleFactor obtained according to Equation where DistScaleFactor=clip3(−1024, 1023, (tb*tx+32)>>6).

Figure 13:
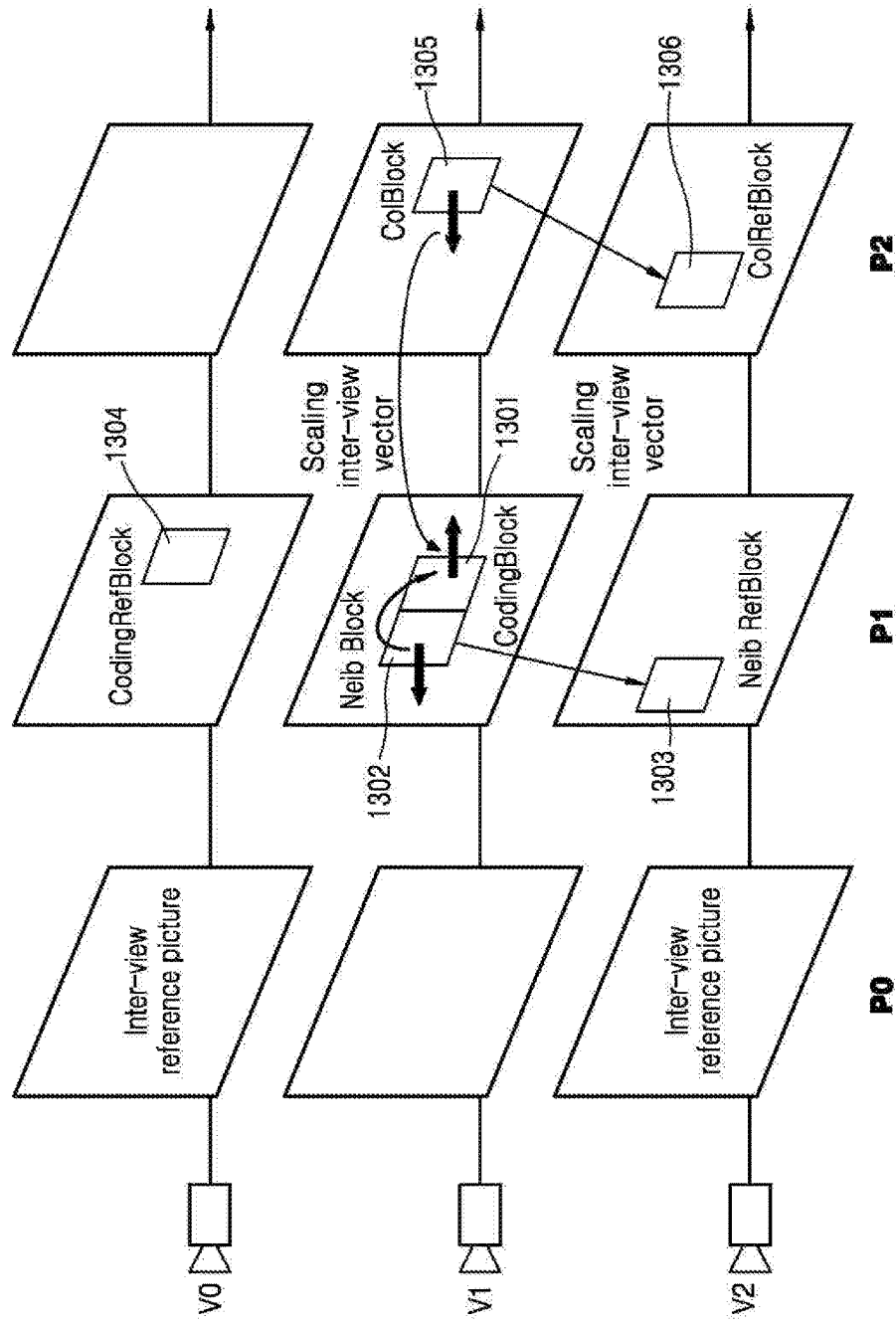
FIG. 13 illustrates an example of a process of scaling an inter-view motion vector, according to an embodiment.

FIG. 13 illustrates an example of a process of scaling an inter-view motion vector, according to an embodiment.

Referring to FIG. 13, it is assumed that a V1-view current block 1301 refers to a V0-view reference block 1304, and a neighbouring block 1302 of the current block 1301 refers to a V2-view block 1303. Since a view index difference value (V1−V0) between the current block 1301 and the reference block 1304 is not same as a view index difference value (V1−V2) between the neighbouring block 1302 and the reference block 1303, an inter-view motion vector predicted from the neighbouring block 1302 may be scaled, and a scaled inter-view motion vector may be used as a prediction motion vector of the current block 1301.

Figure 15:
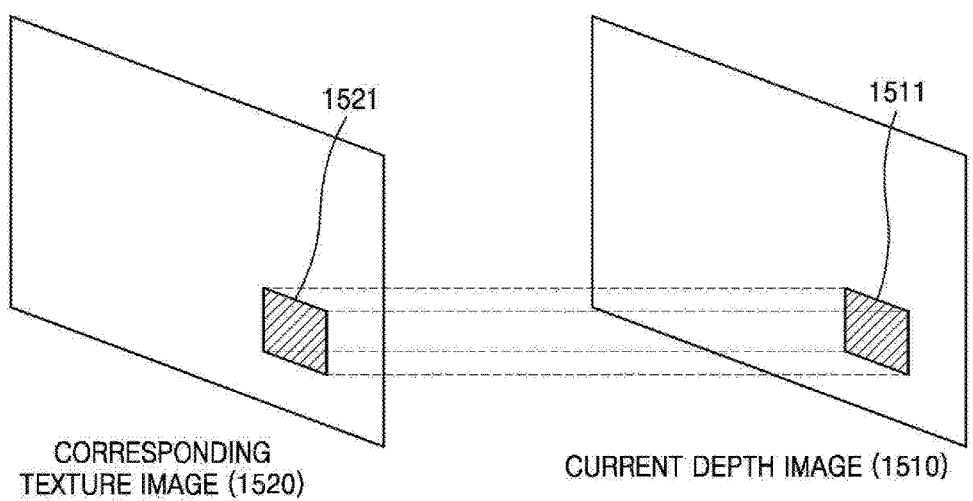
FIG. 15 illustrates a process of determining a motion inheritance candidate, according to an embodiment.

FIG. 15 illustrates a process of determining a motion inheritance candidate, according to an embodiment.

Referring to FIG. 15, a corresponding block of a previous layer, which corresponds to a current block of a current layer, may be included in merge candidates. For example, a corresponding block 1521 that is a collocated block of a texture image 1520, which corresponds to a current block 1511 of a depth image 1510, may be included in the merge candidates to be encoded in encoding/decoding the current block 1511. As described above, whether to inherit motion information of a corresponding block at a same position as a current bock, wherein the corresponding block is included in another layer, and to include the corresponding block in merge candidates may be signalled by using an MPI flag. When an MPI candidate is used, the inter predictor 33 or 55 adds, in addition to the MPI candidate, an inter-view candidate, a spatial candidate, a disparity candidate, a temporal candidate, and a VSP candidate according to a predetermined priority order to the merge candidate list, and the adding process with respect to the merge candidate list is performed until the number of merge candidates included in the merge candidate list reaches a preset value of the maximum number of the merge candidates. Even if a process of obtaining the merge candidate list is performed, when the number of merge candidates included in the merge candidate list is less than the preset maximum number of the merge candidates, the inter predictor 33 or 55 may add a zero vector of (0,0) to the merge candidate list. Other merge candidates besides the MIP candidate may be selectively used.

When the MPI candidate is not used, the inter predictor 33 or 55 adds, excluding the MPI candidate, the inter-view candidate, the spatial candidate, the disparity candidate, the temporal candidate, and the VSP candidate according to the predetermined priority order to the merge candidate list, and the adding process with respect to the merge candidate list is performed until the number of merge candidates included in the merge candidate list reaches the preset value of the maximum number of the merge candidates. Even if the process of obtaining the merge candidate list is performed, when the number of merge candidates included in the merge candidate list is less than the preset maximum number of the merge candidates, the inter predictor 33 or 55 may add the zero vector of (0,0) to the merge candidate list.

FIG. 14 illustrates VPS extension information, according to an embodiment.

Information related to a single-view video may be transmitted via VPS information, and information related to encoding each of layer images constructing a multiview video may be included in VPS extension information and may be transmitted to a decoder.

Describing syntax related to an embodiment of the invention with reference to FIG. 14, iv_mv_pred_flag[layerId] specifies whether or not inter-view motion parameter prediction is used in a process of decoding an image of a layer indicated by layerId. When iv_mv_pred_flag[layerId] is 0, it means that the inter-view motion parameter prediction is not performed on the layer. When iv_mv_pred_flag[layerId] is 1, it means that the inter-view motion parameter prediction may be used with respect to the layer.

view_synthesis_pred_flag[layerId] specifies whether or not view synthesis prediction is used in the process of decoding the image of the layer indicated by layerId. When view_synthesis_pred_flag[layerId] is 0, it means that the view synthesis prediction is not performed in the layer. When the view_synthesis_pred_flag[layerId] is 1, it means that the view synthesis prediction may be used with respect to the layer.

mpi_flag[layerId] specifies whether or not MPI using motion information of a previous layer image is performed on a layer image indicated by layerId. As described above, it is set so that mpi_flag has a value of 1 with respect to a layer image that is used by an MPI candidate, and mpi_flag has a value of 0 with respect to a layer image that is not used by the MPI candidate.

A decoder obtains mpi_flag[layerId] from a VPS, and if mpi_flag has a value of 1 when the decoder decodes a block predicted in a merge mode from among blocks included in a layer image indicated by layered, the decoder includes an MPI candidate in a merge candidate list, and if mpi_flag has a value of 0, the decoder does not use the MPI candidate and obtains the merge candidate list by using another merge candidate.

Figure 16:
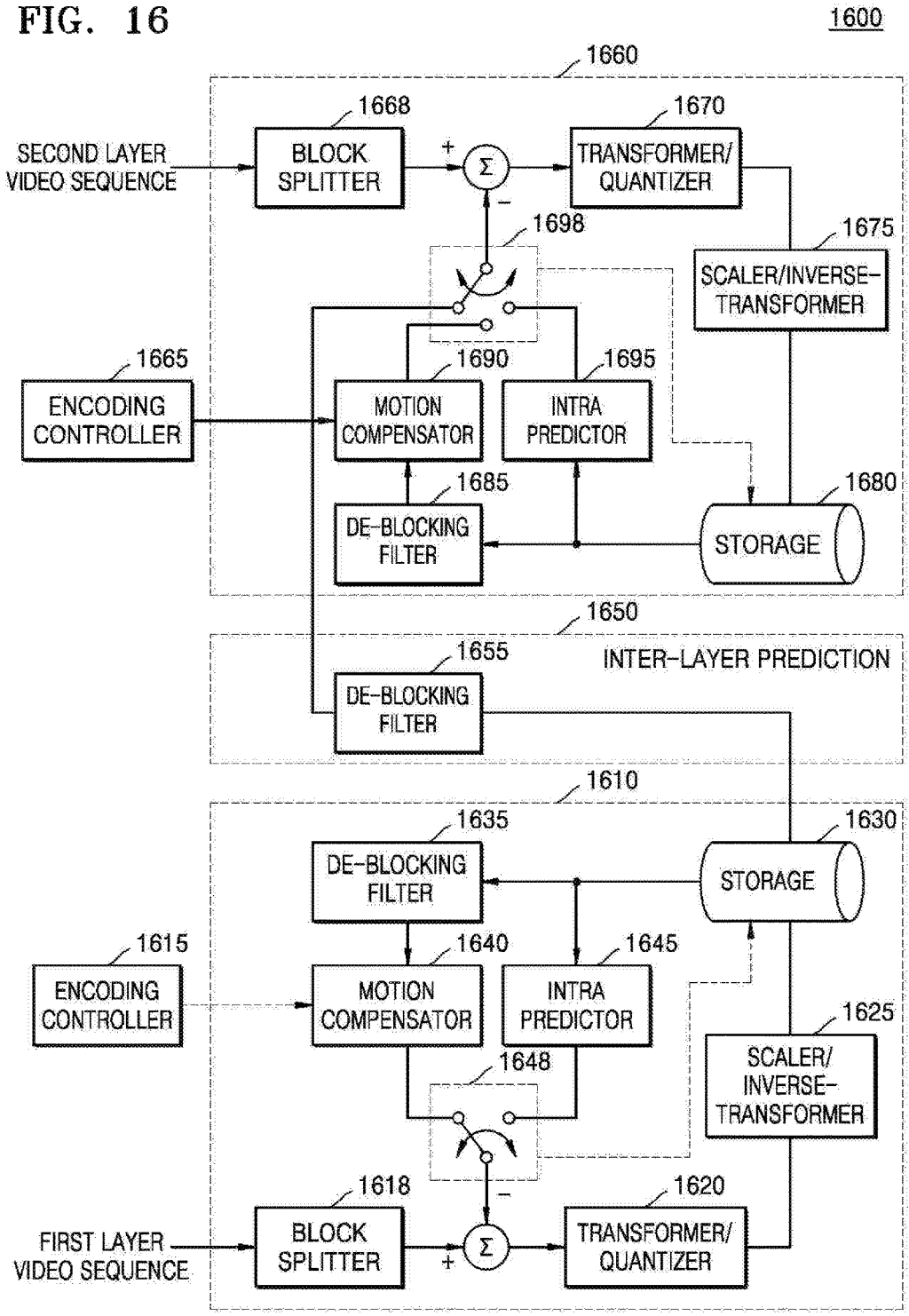
FIG. 16 is a block diagram of a multiview video encoding apparatus, according to an embodiment.

FIG. 16 is a block diagram of a multiview video encoding apparatus, according to an embodiment.

A multiview video encoding apparatus 1600 includes a first layer encoding apparatus 1610, a second layer encoding apparatus 1660, and an inter-layer prediction apparatus 1650.

A block splitter 1618 of a first layer splits a first layer image into data units including a largest coding unit, a coding unit, a prediction unit, a transformation unit, etc. Intra prediction or inter prediction may be performed on the prediction unit included in coding units output from the block splitter 1618. A motion compensator 1640 performs the inter prediction on the prediction unit and thus outputs a prediction value of the prediction unit, and an intra predictor 1645 performs the intra prediction on the prediction unit and thus outputs a prediction value of the prediction unit.

An encoding controller 1615 determines, from among an intra prediction mode and an inter prediction mode, a prediction mode that is used in obtaining a prediction value highly similar to the current prediction unit, and controls a prediction switch 1648 so that a prediction value according to the determined prediction mode is output. A residual that is a difference value between a prediction value of a current block and the current block, wherein the prediction value is obtained due to the intra prediction or the inter prediction, is transformed and quantized by a transformer/quantizer 1620, so that a quantized transformation coefficient is output. A scaler/inverse-transformer 1625 reconstructs the residual by performing scaling and inverse-transformation on the quantized transformation coefficient. A storage 1630 adds up the reconstructed residual and the prediction value of the current block, and stores the reconstructed current block. The encoding process is repeatedly performed on each of the coding units of the first layer image, which are split by the block splitter 1618. According to the encoding process for the first layer image, a structure of the first layer image including a largest coding unit, a coding unit, a prediction unit, and a transformation unit, which has a smallest cost, may be determined. A de-blocking filter 1635 performs filtering on the reconstructed first layer image and thus decreases an artifact included in the reconstructed first layer image.

The inter-layer prediction apparatus 1650 outputs first layer image information to the second layer encoding apparatus 1660 so as to make the first layer image used in prediction encoding the second layer image. A de-blocking unit 1655 of the inter-layer prediction apparatus 1650 performs de-blocking filtering on the first layer image that was encoded and then reconstructed, and outputs the filtered first layer image to the second layer encoding apparatus 1660.

The second layer encoding apparatus 1660 encodes the second layer image, according to encoding information about the first layer image encoded in the first layer encoding apparatus 1610. The second layer encoding apparatus 1660 may changelessly apply the encoding information about the first layer image, which is determined in the first layer encoding apparatus 1610, or may change the encoding information about the first layer image and thus may determine encoding information to be applied in encoding the second layer image.

A block splitter 1668 of the second layer splits the second layer image into data units including a largest coding unit, a coding unit, a prediction unit, a transformation unit, etc. The block splitter 1668 of the second layer may determine a structure of the data units of the second layer image, according to information of the structure of the data units including a largest coding unit, a coding unit, a prediction unit, a transformation unit, etc. which are determined with respect to the first layer image.

Intra prediction or inter prediction may be performed on each of prediction units included in coding units of the second layer output from the block splitter 1668. A motion compensator 1690 performs the inter prediction on a current block and thus outputs a prediction value, and an intra predictor 1695 performs the intra prediction on the current block and thus outputs a prediction value. The motion compensator 1690 may determine a motion vector of a block of the second layer by scaling a motion vector of a block of the first layer which corresponds to the block of the second layer. Also, the motion compensator 1690 may not use a motion vector of the first layer but may perform individual motion prediction and thus may determine a motion vector of a current block of the second layer.

An encoding controller 1665 of the second layer determines, from among an intra prediction mode and an inter prediction mode, a prediction mode that has a prediction value highly similar to the current block of the second layer, and controls a prediction switch 1698 so that a prediction value of the current block according to the determined prediction mode is output. A residual that is a difference value between the current block and the prediction value that is obtained due to the intra prediction or the inter prediction is transformed and quantized by a transformer/quantizer 1670, so that a quantized transformation coefficient is output. A scaler/inverse-transformer 1675 reconstructs the residual by performing scaling and inverse-transformation on the quantized transformation coefficient. A storage 1680 adds up the reconstructed residual and the prediction value of the current block, and thus reconstructs the current block and stores the reconstructed current block. A de-blocking unit 1685 performs de-blocking filtering on the reconstructed second layer image.

Figure 17:
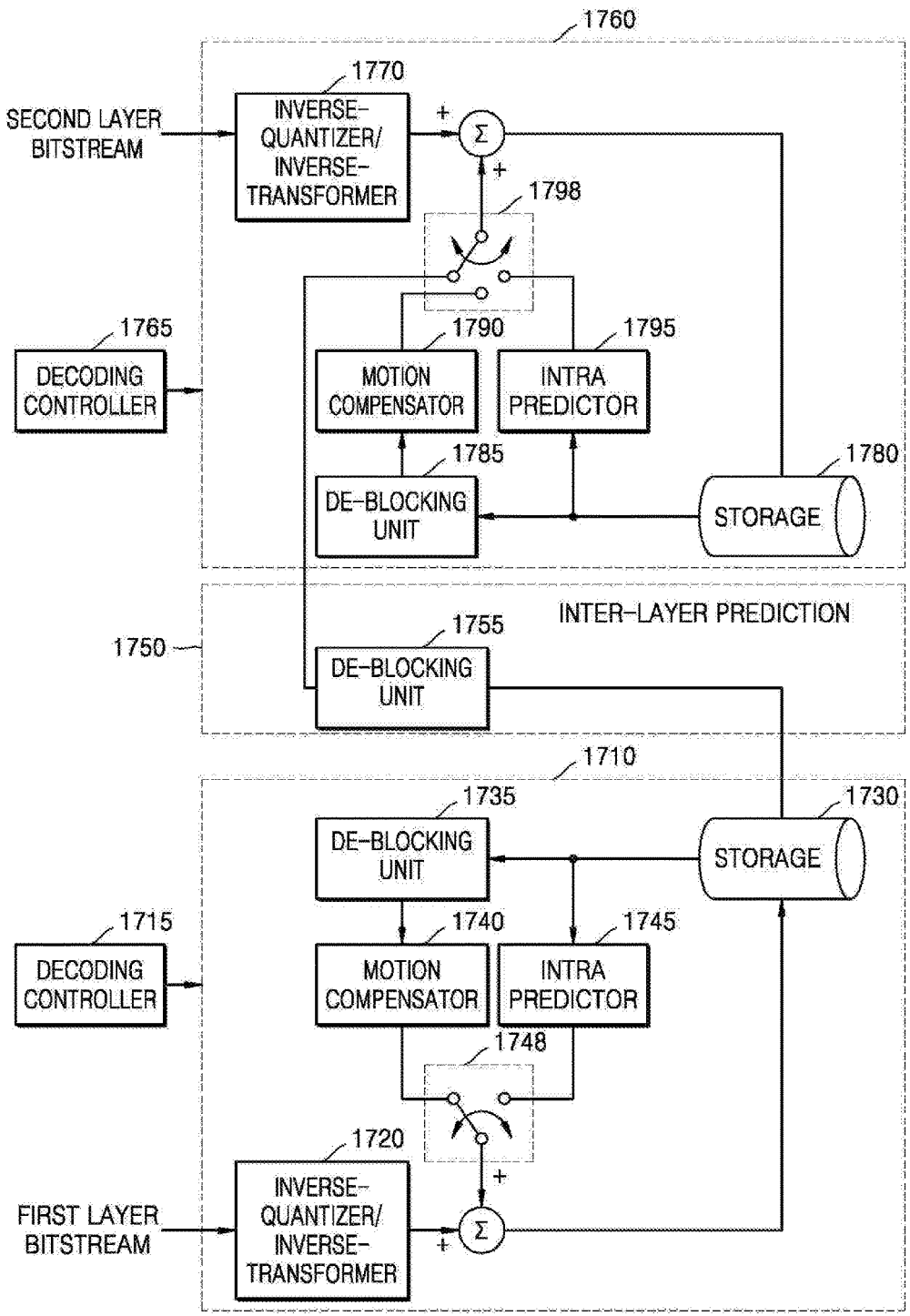
FIG. 17 is a block diagram of a multiview video decoding apparatus, according to an embodiment.

FIG. 17 is a block diagram of a multiview video decoding apparatus, according to an embodiment.

A multiview video decoding apparatus 1700 includes a first layer decoding apparatus 1710 and a second layer decoding apparatus 1760.

When encoding information of a first layer image and encoding information of a second layer image are parsed from a bitstream and thus are input, an inverse-quantizer/inverse-transformer 1720 performs inverse quantization and inverse transformation on a residual of the first layer image and thus outputs reconstructed residual information. A motion compensator 1740 performs inter prediction on a current block and thus outputs a prediction value, and an intra predictor 1745 performs intra prediction on the current block and thus outputs a prediction value.

A decoding controller 1715 determines a prediction mode from among an intra prediction mode and an inter prediction mode, based on prediction mode information about the current block of the first layer image included in the encoding information of the first layer image, and controls a prediction switch 1748 so that a prediction value according to the determined prediction mode is output. The prediction value of the current block, which is obtained due to the intra prediction or the inter prediction, and a reconstructed residual are added up, so that the current block of a first layer is reconstructed. The reconstructed first layer image is stored in a storage 1730. A de-blocking unit 1735 performs de-blocking filtering on the reconstructed first layer image.

An inter-layer prediction apparatus 1750 outputs first layer image information to the second layer decoding apparatus 1760 so as to allow the first layer image to be used in prediction decoding a second layer image. A de-blocking unit 1755 of the inter-layer prediction apparatus 1750 performs de-blocking filtering on the reconstructed first layer image, and outputs the filtered first layer image to the second layer decoding apparatus 1760.

The second layer decoding apparatus 1760 decodes the second layer image by using the encoding information of the first layer image decoded by the first layer decoding apparatus 1710. The second layer decoding apparatus 1760 may changelessly apply the encoding information of the first layer image, which is determined in the first layer decoding apparatus 1710, or may change the encoding information of the first layer image and thus may determine encoding information to be applied in decoding the second layer image. An inverse-quantizer/inverse-transformer 1770 performs inverse quantization and inverse transformation on a residual of the second layer image and thus outputs reconstructed residual information.

A motion compensator 1790 performs inter prediction on a current block of a second layer and thus outputs a prediction value, and an intra predictor 1795 performs intra prediction on the current block of the second layer and thus outputs a prediction value. The motion compensator 1790 may determine a motion vector of the current block of the second layer by scaling a motion vector of a corresponding block of the first layer which corresponds to the current block of the second layer, or may obtain the motion vector of the current block of the second layer, according to motion vector information of the current block of the second layer which is encoded independently from the motion vector of the corresponding block of the first layer and then is included in the bitstream.

A decoding controller 1765 determines a prediction mode from among an intra prediction mode and an inter prediction mode, based on prediction mode information included in the encoding information of the second layer image, and controls a prediction switch 1798 so that a prediction block based on the determined prediction mode is output. The prediction value of a current prediction unit of the second layer, which is obtained due to the intra prediction or the inter prediction, and the reconstructed residual are added up so that the current block is reconstructed. The reconstructed second layer image is stored in a storage 1780. A de-blocking unit 1785 performs de-blocking filtering on the reconstructed second layer image.

FIG. 18 illustrates an example of pseudo code for forming a merge candidate list for a multiview video, according to an embodiment.

The inter predictor 33 or 55 determines, based on mpi_flag, whether motion information of a corresponding block of a previous layer is available, and when the motion information of the corresponding block of the previous layer is available, i.e., when mpi_flag has a value of 1, and a corresponding block T of the previous layer has the motion information, the corresponding block T of the previous layer is added to a merge candidate list (extMergeCandList). When mpi_flag indicates 0, the motion information of the corresponding block of the previous layer is set to be unavailable. That is, when mpi_flag is 0, availableFlagT indicating the motion information of the corresponding block of the previous layer is set to 0. For example, in a case where a current layer is a depth image, and the pervious layer is a texture image, when a prediction mode of a current block of the depth image is a merge mode, and mpi_flag is 1, the inter predictor 33 or 55 includes, as a merge candidate, a corresponding block of the texture image in the merge candidate list.

When a disparity derive merge candidate (D) is available, availableFlagD is set to 1, and the inter predictor 33 or 55 adds the derive merge candidate (D) to the merge candidate list (extMergeCandList).

Next, the inter predictor 33 or 55 adds, to the merge candidate list (extMergeCandList), an A1 block, a B1 block, and a B0 block as an inter-view motion compensation merge candidate (IvMC) and a spatial merge candidate. Through the process, when the number of merge candidates included in the merge candidate list is less than the maximum number of the merge candidates, an A0 block and a B2 block, as an inter-view disparity compensation merge candidate (IvDC), a view synthesis merge candidate (VSP), and a spatial merge candidate, are continuously added to the merge candidate list (extMergeCandList). In addition, as the merge candidate, a shift inter-view motion compensation merge candidate (IvMCShift) and a shift inter-view disparity compensation merge candidate (IvDCShift) which are obtained by shifting the inter-view motion compensation merge candidate (IvMC) and the an inter-view disparity compensation merge candidate (IvDC), based on a block size, etc., may be added to the merge candidate list (extMergeCandList).

As described above, types and the number of the merge candidates to be included in the merge candidate list, and a merge order are not limited thereto and thus may be changed.

In the multiview video encoding apparatus and the multiview video decoding apparatus according to embodiments, each of pictures of a multiview video is split into coding units of a tree structure, and for inter-layer prediction or inter prediction with respect to a coding unit, coding units, prediction units, and transformation units may be used. Hereinafter, with reference to FIGS. 19 through 20, a video encoding method and apparatus and a video decoding method and apparatus based on coding units and transformation units having a tree structure according to an embodiment will be described.

When the multiview video is encoded/decoded, encoding/decoding processes for first layer images, and encoding/decoding processes for second layer images may be separately performed. An independent layer image may be independently encoded/decoded without referring to another layer image. A dependent layer image may be encoded/decoded by referring to another layer image.

Figure 19:
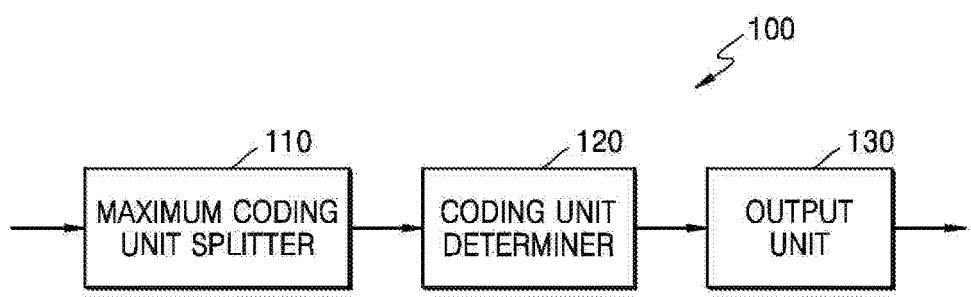
FIG. 19 illustrates a block diagram of a video encoding apparatus based on coding units of a tree structure 100, according to an embodiment of the present invention.

FIG. 19 illustrates a block diagram of a video encoding apparatus based on coding units of a tree structure 100, according to an embodiment of the present invention.

The video encoding apparatus involving video prediction based on coding units of the tree structure 100 includes a coding unit determiner 120 and an output unit 130. Hereinafter, for convenience of description, the video encoding apparatus involving video prediction based on coding units of the tree structure 100 is referred to as the 'video encoding apparatus 100'.

The coding unit determiner 120 may split a current picture based on a largest coding unit that is a coding unit having a maximum size for a current picture of an image. If the current picture is larger than the largest coding unit, image data of the current picture may be split into the at least one largest coding unit. The largest coding unit according to an embodiment may be a data unit having a size of 32×32, 64×64, 128×128, 256×256, etc., wherein a shape of the data unit is a square having a width and length in squares of 2.

A coding unit according to an embodiment may be characterized by a maximum size and a depth. The depth denotes the number of times the coding unit is spatially split from the largest coding unit, and as the depth deepens, deeper coding units according to depths may be split from the largest coding unit to a smallest coding unit. A depth of the largest coding unit may be defined as an uppermost depth and a depth of the smallest coding unit may be defined as a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to an embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 120 encodes at least one split region obtained by splitting a region of the largest coding unit according to depths, and determines a depth to output a finally encoded image data according to the at least one split region. That is, the coding unit determiner 120 determines a final depth by encoding the image data in the deeper coding units according to depths, according to the largest coding unit of the current picture, and selecting a depth having the least encoding error. The determined final depth and image data according to largest coding units are output to the output unit 130.

The image data in the largest coding unit is encoded based on the deeper coding units corresponding to at least one depth equal to or below the maximum depth, and results of encoding the image data based on each of the deeper coding units are compared. A depth having the least encoding error may be selected after comparing encoding errors of the deeper coding units. At least one final depth may be selected for each largest coding unit.

The size of the largest coding unit is split as a coding unit is hierarchically split according to depths, and as the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the encoding errors may differ according to regions in the one largest coding unit, and thus the final depths may differ according to regions in the image data. Thus, one or more final depths may be determined in one largest coding unit, and the image data of the largest coding unit may be divided according to coding units of at least one final depth.

Accordingly, the coding unit determiner 120 according to the embodiment may determine coding units having a tree structure included in the largest coding unit. The 'coding units having a tree structure' according to an embodiment include coding units corresponding to a depth determined to be the final depth, from among all deeper coding units included in the largest coding unit. A coding unit of a final depth may be hierarchically determined according to depths in the same region of the largest coding unit, and may be independently determined in different regions. Equally, a final depth in a current region may be determined independently from a final depth in another region.

A maximum depth according to an embodiment is an index related to the number of splitting times from a largest coding unit to a smallest coding unit. A first maximum depth according to an embodiment may denote the total number of splitting times from the largest coding unit to the smallest coding unit. A second maximum depth according to an embodiment may denote the total number of depth levels from the largest coding unit to the smallest coding unit. For example, when a depth of the largest coding unit is 0, a depth of a coding unit, in which the largest coding unit is split once, may be set to 1, and a depth of a coding unit, in which the largest coding unit is split twice, may be set to 2. Here, if the smallest coding unit is a coding unit in which the largest coding unit is split four times, depth levels of depths 0, 1, 2, 3, and 4 exist, and thus the first maximum depth may be set to 4, and the second maximum depth may be set to 5.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the transformation, is performed on all of the deeper coding units generated as the depth deepens. Hereinafter, for convenience of description, the prediction encoding and the transformation will be described based on a coding unit of a current depth in at least one largest coding unit.

The video encoding apparatus 100 according to the embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but may also select a data unit different from the coding unit so as to perform the prediction encoding on the image data in the coding unit.

In order to perform prediction encoding in the largest coding unit, the prediction encoding may be performed based on a coding unit of a final depth, i.e., based on the coding unit that is no longer split. Hereinafter, the coding unit that is no longer split and becomes a basis unit for prediction encoding will now be referred to as a 'prediction unit'. A partition obtained by splitting the prediction unit may include a prediction unit and a data unit obtained by splitting at least one selected from a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition mode may include symmetrical partitions obtained by symmetrically splitting a height or width of the prediction unit, and may selectively include partitions obtained by asymmetrically splitting the height or width of the prediction unit, such as 1:n or n:1, partitions obtained by geometrically splitting the prediction unit, and partitions having arbitrary shapes.

A prediction mode of the prediction unit may be at least one of an intra mode, an inter mode, and a skip mode. For example, the intra mode or the inter mode may be performed on the partition of 2N×2N, 2N×N, N×2N, or N×N. Also, the skip mode may be performed only on the partition of 2N×2N. The encoding may be independently performed on one prediction unit in a coding unit, thereby selecting a prediction mode having a least encoding error.

The video encoding apparatus 100 according to the embodiment may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the transformation unit may include a data unit for an intra mode and a transformation unit for an inter mode.

The transformation unit in the coding unit may be recursively split into smaller sized regions in the similar manner as the coding unit according to the tree structure, thus, residual data of the coding unit may be divided according to the transformation unit having the tree structure according to a transformation depth.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. That is, with respect to the transformation unit, the transformation unit having the tree structure may be set according to the transformation depths.

Split information according to depths requires not only information about a depth but also requires information related to prediction and transformation. Accordingly, the coding unit determiner 120 may determine not only a depth generating a least encoding error but may also determine a partition mode in which a prediction unit is split to partitions, a prediction mode according to prediction units, and a size of a transformation unit for transformation.

Coding units according to a tree structure in a largest coding unit and methods of determining a prediction unit/partition, and a transformation unit, according to embodiments, will be described in detail later with reference to FIGS. 19 through 20.

The coding unit determiner 120 may measure an encoding error of deeper coding units according to depths by using Rate-Distortion Optimization based on Lagrangian multipliers.

The output unit 130 outputs, in bitstreams, the image data of the largest coding unit, which is encoded based on the at least one depth determined by the coding unit determiner 120, and information according to depths.

The encoded image data may correspond to a result obtained by encoding residual data of an image.

The split information according to depths may include depth information, partition mode information of the prediction unit, prediction mode information, and the split information of the transformation unit.

Final depth information may be defined by using split information according to depths, which specifies whether encoding is performed on coding units of a lower depth instead of a current depth. If the current depth of the current coding unit is a depth, the current coding unit is encoded by using the coding unit of the current depth, and thus split information of the current depth may be defined not to split the current coding unit to a lower depth. On the contrary, if the current depth of the current coding unit is not the depth, the encoding has to be performed on the coding unit of the lower depth, and thus the split information of the current depth may be defined to split the current coding unit to the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one largest coding unit, and at least one piece of split information has to be determined for a coding unit of a depth, at least one piece of split information may be determined for one largest coding unit. Also, a depth of data of the largest coding unit may vary according to locations since the data is hierarchically split according to depths, and thus a depth and split information may be set for the data.

Accordingly, the output unit 130 according to the embodiment may assign encoding information about a corresponding depth and an encoding mode to at least one of the coding unit, the prediction unit, and a minimum unit included in the largest coding unit.

The minimum unit according to an embodiment is a square data unit obtained by splitting the smallest coding unit constituting the lowermost depth by 4. Alternatively, the minimum unit according to an embodiment may be a maximum square data unit that may be included in all of the coding units, prediction units, partition units, and transformation units included in the largest coding unit.

For example, the encoding information output by the output unit 130 may be classified into encoding information according to deeper coding units, and encoding information according to prediction units. The encoding information according to the deeper coding units may include the information about the prediction mode and about the size of the partitions. The encoding information according to the prediction units may include information about an estimated direction during an inter mode, about a reference image index of the inter mode, about a motion vector, about a chroma component of an intra mode, and about an interpolation method during the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit allowed with respect to a current video, and information about a minimum size of the transformation unit may also be output through a header of a bitstream, a sequence parameter set, or a picture parameter set. The output unit 130 may encode and output reference information, prediction information, and slice type information, which are related to prediction.

According to the simplest embodiment for the video encoding apparatus 100, the deeper coding unit may be a coding unit obtained by dividing a height or width of a coding unit of an upper depth, which is one layer above, by two. That is, when the size of the coding unit of the current depth is 2N×2N, the size of the coding unit of the lower depth is N×N. Also, a current coding unit having a size of 2N×2N may maximally include four lower-depth coding units having a size of N×N.

Accordingly, the video encoding apparatus 100 may form the coding units having the tree structure by determining coding units having an optimum shape and an optimum size for each largest coding unit, based on the size of the largest coding unit and the maximum depth determined considering characteristics of the current picture. Also, since encoding may be performed on each largest coding unit by using any one of various prediction modes and transformations, an optimal encoding mode may be determined by taking into account characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus according to the embodiment, image compression efficiency may be increased since a coding unit is adjusted while considering characteristics of an image while increasing a maximum size of a coding unit while considering a size of the image.

The multiview video encoding apparatus described above with reference to FIG. 3 may include the video encoding apparatuses 100 corresponding to the number of layers so as to encode single layer images in each of the layers of a multilayer video.

When the video encoding apparatuses 100 encode first layer images, the coding unit determiner 120 may determine a prediction unit for inter-image prediction according to each of coding units of a tree structure in each largest coding unit, and may perform the inter-image prediction on each prediction unit.

When the video encoding apparatuses 100 encode the second layer images, the coding unit determiner 120 may determine prediction units and coding units of a tree structure in each largest coding unit, and may perform inter-prediction on each of the prediction units.

The video encoding apparatuses 100 may encode a luminance difference so as to compensate for the luminance difference between the first layer image and the second layer image. However, whether to perform luminance compensation may be determined according to an encoding mode of a coding unit. For example, the luminance compensation may be performed only on a prediction unit having a size of 2N×2N.

Figure 20:
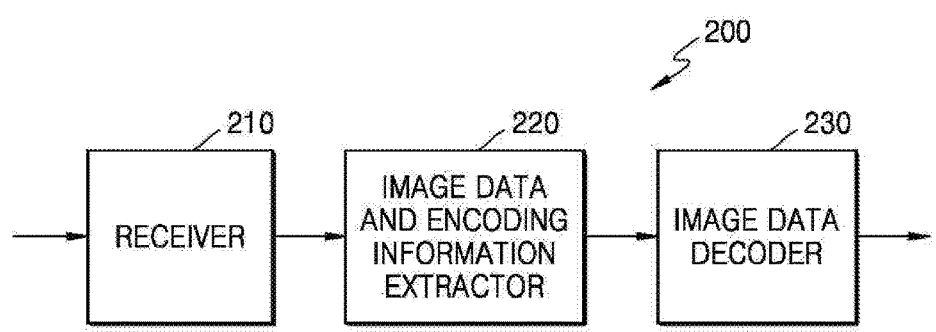
FIG. 20 illustrates a block diagram of a video decoding apparatus based on coding units of a tree structure 200, according to various embodiments.

FIG. 20 illustrates a block diagram of a video decoding apparatus based on coding units of a tree structure 200, according to various embodiments.

The video decoding apparatus involving video prediction based on coding units of the tree structure 200 according to the embodiment includes a receiver 210, an image data and encoding information extractor 220, and an image data decoder 230. Hereinafter, for convenience of description, the video decoding apparatus involving video prediction based on coding units of the tree structure 200 according to the embodiment is referred to as the 'video decoding apparatus 200'.

Definitions of various terms, such as a coding unit, a depth, a prediction unit, a transformation unit, and various types of split information for decoding operations of the video decoding apparatus 200 according to the embodiment are identical to those described with reference to FIG. 19 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each largest coding unit, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts, from the parsed bitstream, a final depth and split information about the coding units having a tree structure according to each largest coding unit. The extracted final depth and the extracted split information are output to the image data decoder 230. That is, the image data in a bit stream is split into the largest coding unit so that the image data decoder 230 may decode the image data for each largest coding unit.

A depth and split information according to each of the largest coding units may be set for one or more pieces of depth information, and split information according to depths may include partition mode information of a corresponding coding unit, prediction mode information, and split information of a transformation unit. Also, as the depth information, the split information according to depths may be extracted.

The depth and the split information according to each of the largest coding units extracted by the image data and encoding information extractor 220 are a depth and split information determined to generate a minimum encoding error when an encoder, such as the video encoding apparatus 100, repeatedly performs encoding for each deeper coding unit according to depths according to each largest coding unit. Accordingly, the video decoding apparatus 200 may reconstruct an image by decoding data according to an encoding method that generates the minimum encoding error.

Since encoding information about the depth and the encoding mode may be assigned to a predetermined data unit from among a corresponding coding unit, a prediction unit, and a minimum unit, the image data and encoding information extractor 220 may extract the depth and the split information according to the predetermined data units. If a depth and split information of a corresponding largest coding unit are recorded according to each of the predetermined data units, predetermined data units having the same depth and the split information may be inferred to be the data units included in the same largest coding unit.

The image data decoder 230 reconstructs the current picture by decoding the image data in each largest coding unit based on the depth and the split information according to each of the largest coding units. That is, the image data decoder 230 may decode the encoded image data, based on a read partition mode, a prediction mode, and a transformation unit for each coding unit from among the coding units having the tree structure included in each largest coding unit. A decoding process may include a prediction process including intra prediction and motion compensation, and an inverse transformation process.

The image data decoder 230 may perform intra prediction or motion compensation according to a partition and a prediction mode of each coding unit, based on the information about the partition type and the prediction mode of the prediction unit of the coding unit according to depths.

In addition, for inverse transformation for each largest coding unit, the image data decoder 230 may read information about a transformation unit according to a tree structure for each coding unit so as to perform inverse transformation based on transformation units for each coding unit. Due to the inverse transformation, a pixel value of a spatial domain of the coding unit may be reconstructed.

The image data decoder 230 may determine a depth of a current largest coding unit by using split information according to depths. If the split information indicates that image data is no longer split in the current depth, the current depth is a depth. Accordingly, the image data decoder 230 may decode the image data of the current largest coding unit by using the information about the partition mode of the prediction unit, the prediction mode, and the size of the transformation unit for each coding unit corresponding to the current depth.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

The multiview video decoding apparatus described above with reference to FIG. 5 may include the video decoding apparatuses 200 corresponding to the number of layers, so as to reconstruct first layer images and second layer images by decoding a received first layer imagestream and a received second layer imagestream.

When the first layer imagestream is received, the image data decoder 230 of the video decoding apparatus 200 may split samples of the first layer images, which are extracted from the first layer imagestream by an extractor 220, into coding units according to a tree structure of a largest coding unit. The image data decoder 230 may perform motion compensation, based on prediction units for the inter-image prediction, on each of the coding units according to the tree structure of the samples of the first layer images, and may reconstruct the first layer images.

When the second layer imagestream is received, the image data decoder 230 of the video decoding apparatus 200 may split samples of the second layer images, which are extracted from the second layer imagestream by the extractor 220, into coding units according to a tree structure of a largest coding unit. The image data decoder 230 may perform motion compensation, based on prediction units for the inter-image prediction, on each of the coding units of the samples of the second layer images, and may reconstruct the second layer images.

The extractor 220 may obtain, from a bitstream, information related to a luminance error so as to compensate for a luminance difference between the first layer image and the second layer image. However, whether to perform luminance compensation may be determined according to an encoding mode of a coding unit. For example, the luminance compensation may be performed only on a prediction unit having a size of 2N×2N.

Thus, the video decoding apparatus 200 may obtain information about at least one coding unit that generates the minimum encoding error when encoding is recursively performed for each largest coding unit, and may use the information to decode the current picture. That is, the coding units having the tree structure determined to be the optimum coding units in each largest coding unit may be decoded.

Accordingly, even if an image has high resolution or has an excessively large data amount, the image may be efficiently decoded and reconstructed by using a size of a coding unit and an encoding mode, which are adaptively determined according to characteristics of the image, by using optimal split information received from an encoding terminal.

Figure 21:
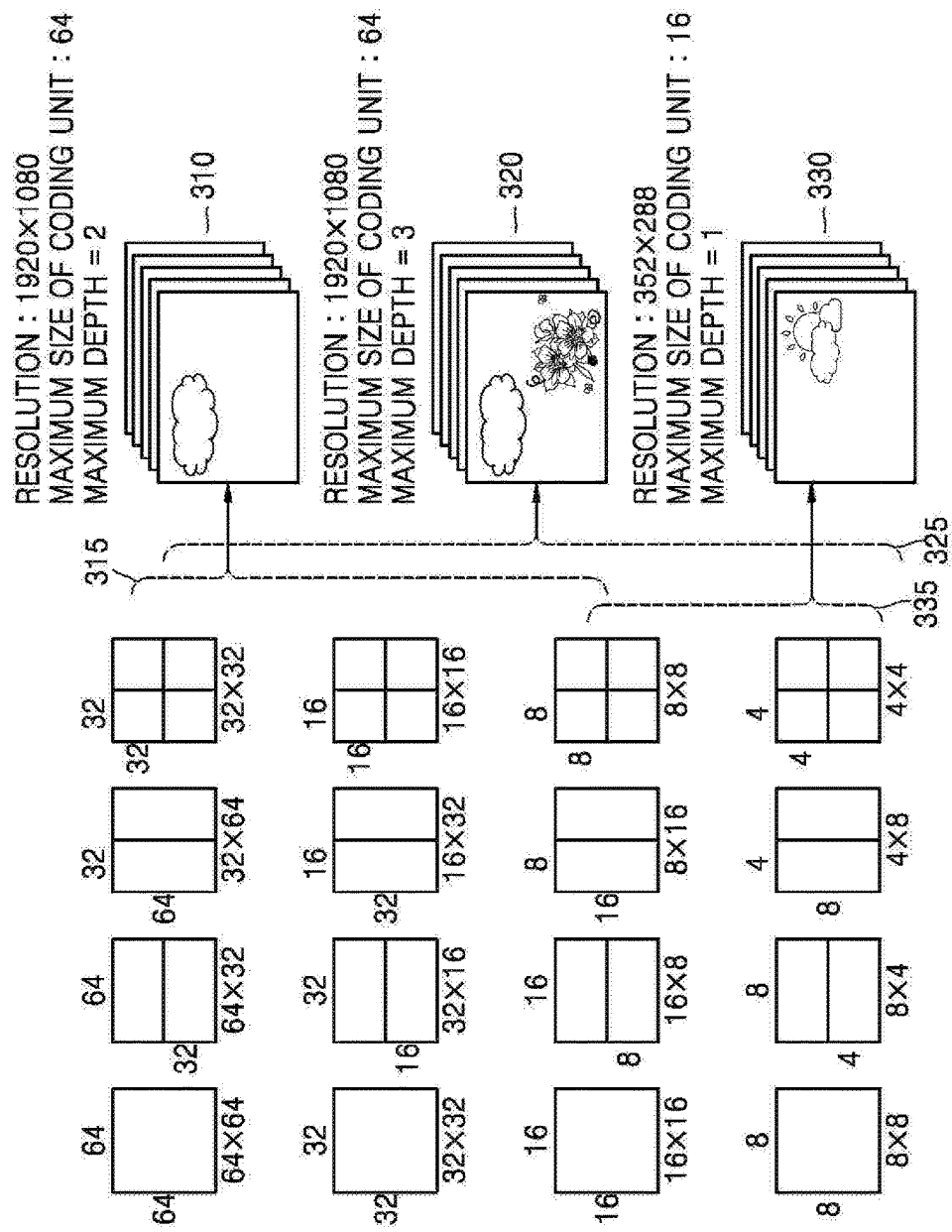
FIG. 21 illustrates a concept of coding units, according to various embodiments.

FIG. 21 illustrates a concept of coding units, according to various embodiments.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 21 denotes the total number of splits from a largest coding unit to a smallest coding unit.

If a resolution is high or a data amount is large, it is preferable that a maximum size of a coding unit is large so as to not only increase encoding efficiency but also to accurately reflect characteristics of an image. Accordingly, the maximum size of the coding unit of the video data 310 and 320 having a higher resolution than the video data 330 may be selected to 64.

Since the maximum depth of the video data 310 is 2, coding units 315 of the vide data 310 may include a largest coding unit having a long axis size of 64, and coding units having long axis sizes of 32 and 16 since depths are deepened to two layers by splitting the largest coding unit twice. On the other hand, since the maximum depth of the video data 330 is 1, coding units 335 of the video data 330 may include a largest coding unit having a long axis size of 16, and coding units having a long axis size of 8 since depths are deepened to one layer by splitting the largest coding unit once.

Since the maximum depth of the video data 320 is 3, coding units 325 of the video data 320 may include a largest coding unit having a long axis size of 64, and coding units having long axis sizes of 32, 16, and 8 since the depths are deepened to 3 layers by splitting the largest coding unit three times. As a depth deepens, an expression capability with respect to detailed information may be improved.

Figure 22:
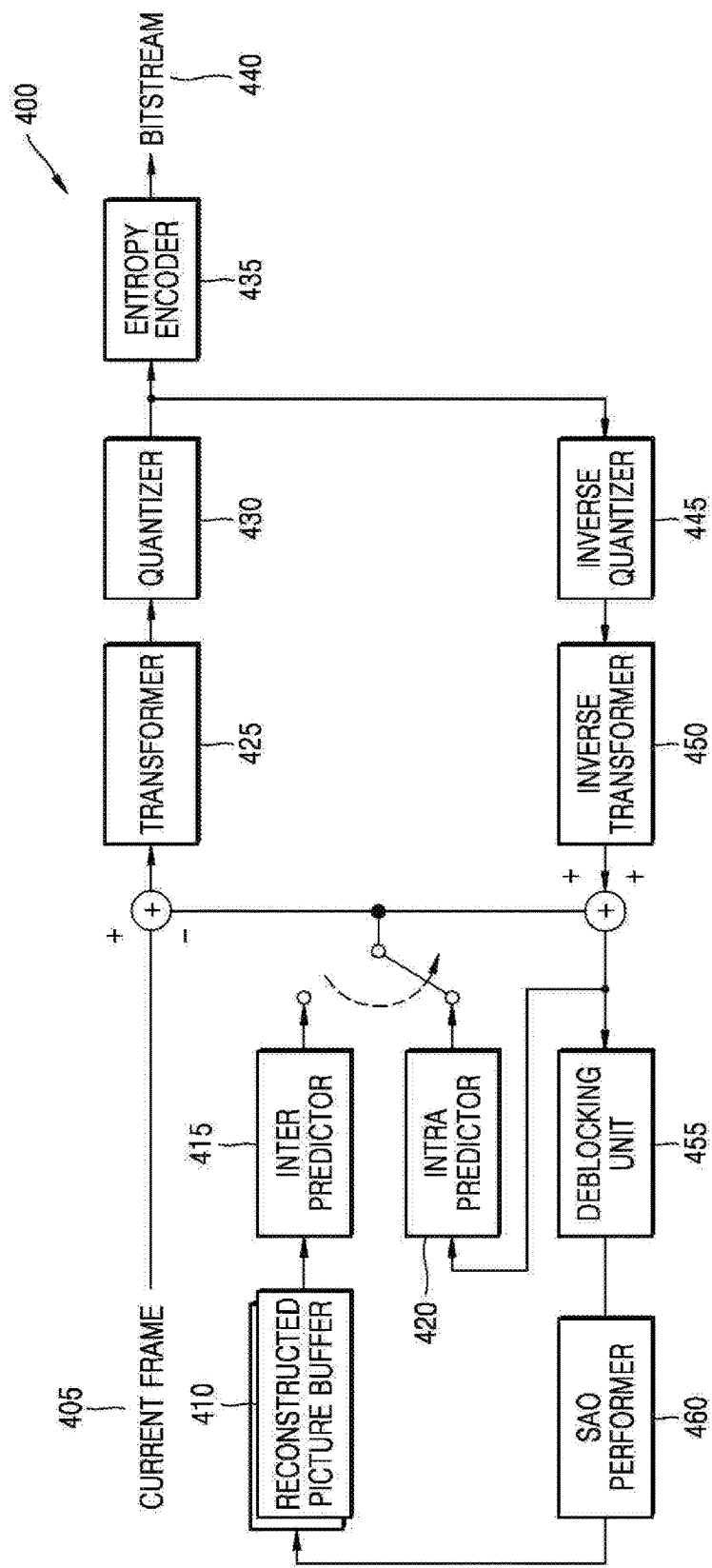
FIG. 22 illustrates a block diagram of an image encoder 400 based on coding units, according to various embodiments.

FIG. 22 illustrates a block diagram of an image encoder 400 based on coding units, according to various embodiments.

The image encoder 400 according to an embodiment performs operations of a picture encoder 120 of the video encoding apparatus 100 so as to encode image data. That is, an intra predictor 420 performs intra prediction on coding units in an intra mode, from among a current image 405, and an inter predictor 415 performs inter prediction on coding units in an inter mode by using the current image 405 and a reference image obtained from a reconstructed picture buffer 410 according to prediction units. The current image 405 may be split into largest coding units and then the largest coding units may be sequentially encoded. In this regard, the largest coding units that are to be split into coding units having a tree structure may be encoded.

Residue data is generated by subtracting prediction data regarding a coding unit of each mode which is output from the intra predictor 420 or the inter predictor 415 from data regarding an encoded coding unit of the current image 405, and the residue data is output as a quantized transformation coefficient according to transformation units through a transformer 425 and a quantizer 430. The quantized transformation coefficient is reconstructed as the residue data in a spatial domain through an inverse-quantizer 445 and an inverse-transformer 450. The reconstructed residual image data in the spatial domain is added to prediction data for the coding unit of each mode which is output from the intra predictor 420 or the inter predictor 415 and thus is reconstructed as data in a spatial domain for a coding unit of the current image 405. The reconstructed data in the spatial domain is generated as a reconstructed image through a deblocking unit 455 and an SAO performer 460 and the reconstructed image is stored in the reconstructed picture buffer 410. The reconstructed images stored in the reconstructed picture buffer 410 may be used as reference images for inter predicting another image. The transformation coefficient quantized by the transformer 425 and the quantizer 430 may be output as a bitstream 440 through an entropy encoder 435.

In order for the image encoder 400 to be applied in the video encoding apparatus 100, all elements of the image encoder 400, i.e., the inter predictor 415, the intra predictor 420, the transformer 425, the quantizer 430, the entropy encoder 435, the inverse-quantizer 445, the inverse-transformer 450, the deblocking unit 455, and the SAO performer 460, may perform operations based on each coding unit among coding units having a tree structure according to each largest coding unit.

In particular, the intra predictor 420 and the inter predictor 415 may determine a partition mode and a prediction mode of each coding unit from among the coding units having a tree structure, by taking into account the maximum size and the maximum depth of a current largest coding unit, and the transformer 425 may determine whether to split a transformation unit according to a quadtree in each coding unit from among the coding units having a tree structure.

Figure 23:
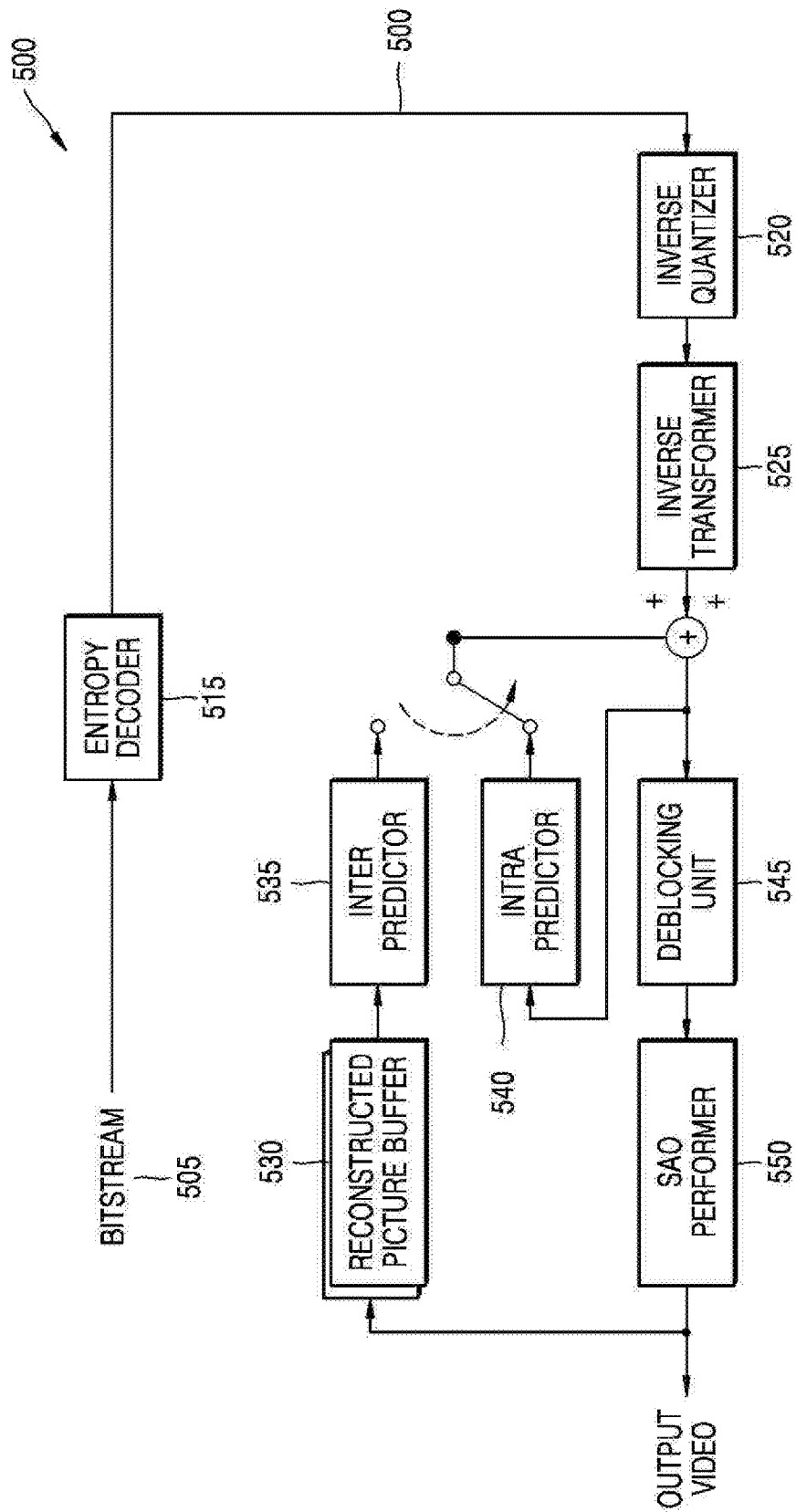
FIG. 23 illustrates a block diagram of an image decoder 500 based on coding units, according to various embodiments.

FIG. 23 illustrates a block diagram of an image decoder 500 based on coding units, according to various embodiments.

An entropy decoder 515 parses, from a bitstream 505, encoded image data to be decoded and encoding information required for decoding. The encoded image data corresponds to a quantized transformation coefficient, and an inverse-quantizer 520 and an inverse-transformer 525 reconstruct residue data from the quantized transformation coefficient.

An intra predictor 540 performs intra prediction on a coding unit in an intra mode according to prediction units. An inter predictor 535 performs inter prediction by using a reference image with respect to a coding unit in an inter mode from among a current image, wherein the reference image is obtained by a reconstructed picture buffer 530 according to prediction units.

Prediction data and residue data regarding coding units of each mode, which passed through the intra predictor 540 and the inter predictor 535, are summed, so that data in a spatial domain regarding coding units of the current image 405 may be reconstructed, and the reconstructed data in the spatial domain may be output as a reconstructed image 560 through a deblocking unit 545 and an SAO performer 550. Reconstructed images stored in the reconstructed picture buffer 530 may be output as reference images.

In order for a picture decoder 230 of the video decoding apparatus 200 to decode the image data, operations after the entropy decoder 515 of the image decoder 500 according to an embodiment may be performed.

In order for the image decoder 500 to be applied in the video decoding apparatus 200 according to an embodiment, all elements of the image decoder 500, i.e., the entropy decoder 515, the inverse-quantizer 520, the inverse-transformer 525, the intra predictor 540, the inter predictor 535, the deblocking unit 545, and the SAO performer 550 may perform operations based on coding units having a tree structure for each largest coding unit.

In particular, the intra predictor 540 and the inter predictor 535 may determine a partition mode and a prediction mode of each coding unit from among the coding units according to a tree structure, and the inverse-transformer 525 may determine whether or not to split a transformation unit according to a quadtree in each coding unit.

The encoding operation of FIG. 21 and the decoding operation of FIG. 22 are described as a videostream encoding operation and a videostream decoding operation, respectively, in a single layer. Thus, if the multiview video encoder 30 of FIG. 3 encodes a plurality of layer images, the image encoder 400 may be included in each layer so as to encode each of the layer images. Similarly, when the multiview video decoder 52 of FIG. 5 decodes a plurality of layer images, the image decoder 500 may be included in each layer.

Figure 24:
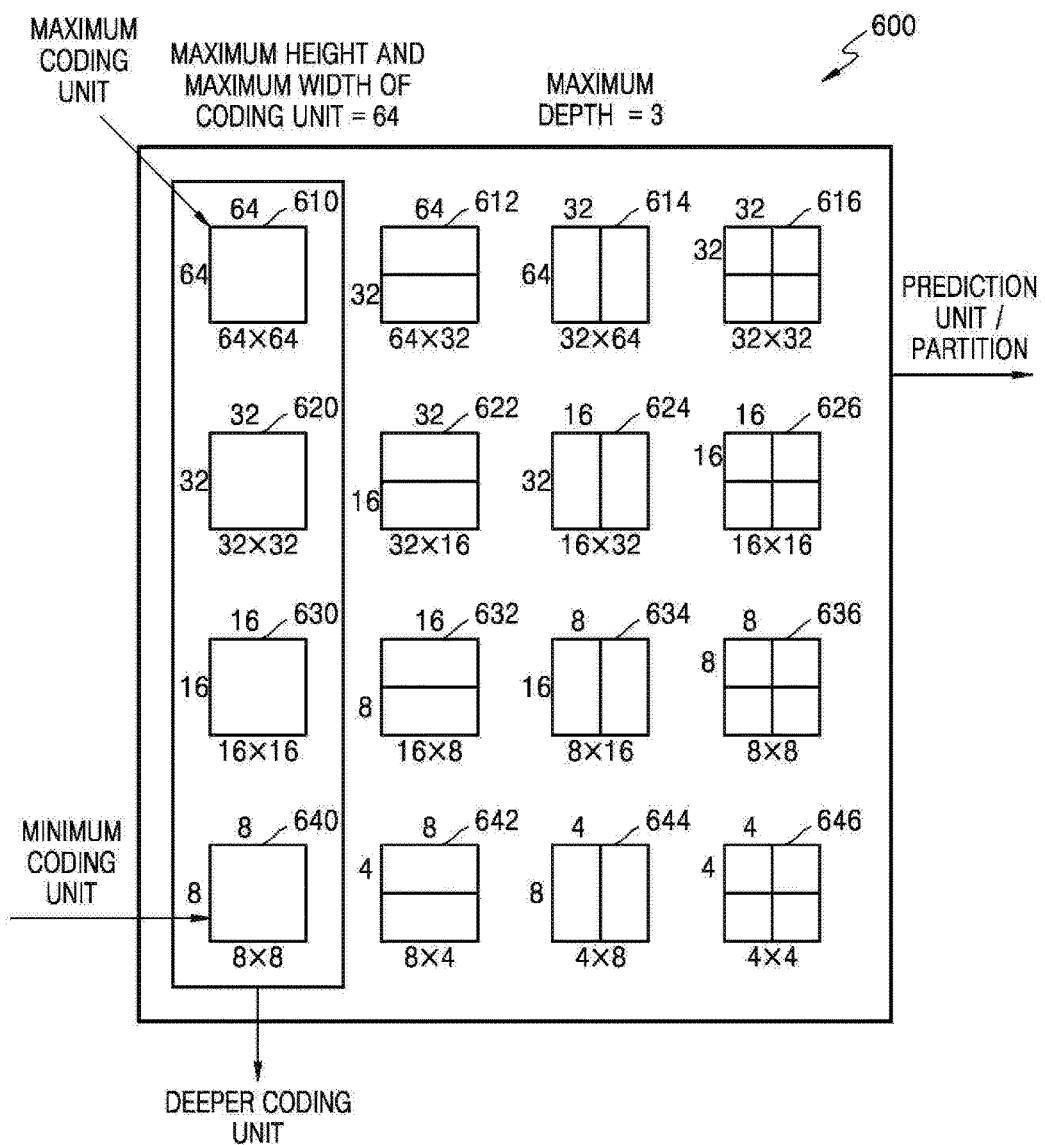
FIG. 24 illustrates deeper coding units according to depths, and partitions, according to various embodiments.

FIG. 24 illustrates deeper coding units according to depths, and partitions, according to various embodiments.

The video encoding apparatus 100 according to an embodiment and the video decoding apparatus 200 according to an embodiment use hierarchical coding units so as to consider characteristics of an image. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure of coding units 600 according to an embodiment, the maximum height and the maximum width of the coding units are each 64, and the maximum depth is 3. In this case, the maximum depth represents a total number of times the coding unit is split from the largest coding unit to the smallest coding unit. Since a depth deepens along a vertical axis of the hierarchical structure of coding units 600, a height and a width of the deeper coding unit are each split. Also, a prediction unit and partitions, which are bases for prediction encoding of each deeper coding unit, are shown along a horizontal axis of the hierarchical structure of coding units 600.

That is, a coding unit 610 is a largest coding unit in the hierarchical structure of coding units 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3. The coding unit 640 having the size of 8×8 and the depth of 3 is a smallest coding unit.

The prediction unit and the partitions of a coding unit are arranged along the horizontal axis according to each depth. That is, if the coding unit 610 having a size of 64×64 and a depth of 0 is a prediction unit, the prediction unit may be split into partitions included in the coding unit 610 having the size of 64×64, i.e. a partition 610 having a size of 64×64, partitions 612 having the size of 64×32, partitions 614 having the size of 32×64, or partitions 616 having the size of 32×32.

Equally, a prediction unit of the coding unit 620 having the size of 32×32 and the depth of 1 may be split into partitions included in the coding unit 620 having the size of 32×32, i.e. a partition 620 having a size of 32×32, partitions 622 having a size of 32×16, partitions 624 having a size of 16×32, and partitions 626 having a size of 16×16.

Equally, a prediction unit of the coding unit 630 having the size of 16×16 and the depth of 2 may be split into partitions included in the coding unit 630 having the size of 16×16, i.e. a partition 630 having a size of 16×16 included in the coding unit 630, partitions 632 having a size of 16×8, partitions 634 having a size of 8×16, and partitions 636 having a size of 8×8.

Equally, a prediction unit of the coding unit 640 having the size of 8×8 and the depth of 3 may be split into partitions included in the coding unit 640 having the size of 8×8, i.e. a partition 640 having a size of 8×8 included in the coding unit 640, partitions 642 having a size of 8×4, partitions 644 having a size of 4×8, and partitions 646 having a size of 4×4.

In order to determine a depth of the largest coding unit 610, the coding unit determiner 120 of the video encoding apparatus 100 has to perform encoding on coding units respectively corresponding to depths included in the largest coding unit 610.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare results of encoding the same data according to depths, the data has to be encoded by using each of the coding unit corresponding to the depth of 1 and four coding units corresponding to the depth of 2.

In order to perform encoding according to each of the depths, a least encoding error that is a representative encoding error of a corresponding depth may be selected by performing encoding on each of prediction units of the coding units according to depths, along the horizontal axis of the hierarchical structure of coding units 600. Also, the minimum encoding error may be searched for by comparing representative encoding errors according to depths, by performing encoding for each depth as the depth deepens along the vertical axis of the hierarchical structure of coding units 600. A depth and a partition generating the minimum encoding error in the largest coding unit 610 may be selected as a depth and a partition mode of the largest coding unit 610.

Figure 25:
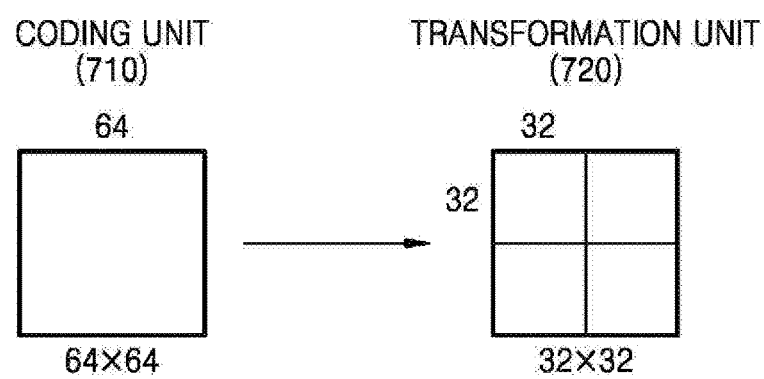
FIG. 25 illustrates a relationship between a coding unit and transformation units, according to various embodiments.

FIG. 25 illustrates a relationship between a coding unit and transformation units, according to various embodiments.

The video encoding apparatus 100 according to an embodiment or the video decoding apparatus 200 according to an embodiment encodes or decodes an image according to coding units having sizes smaller than or equal to a largest coding unit for each largest coding unit. Sizes of transformation units for transformation during an encoding process may be selected based on data units that are not larger than a corresponding coding unit.

For example, in the video encoding apparatus 100 or the video decoding apparatus 200, when a size of a current coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error with respect to an original image may be selected.

FIG. 26 illustrates a plurality of pieces of encoding information, according to various embodiments.

The output unit 130 of the video encoding apparatus 100 according to an embodiment may encode and transmit, as split information, partition mode information 800, prediction mode information 810, and transformation unit size information 820 for each coding unit corresponding to a depth.

The partition mode information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. In this case, the partition mode information 800 about a current coding unit is set to indicate one of the partition 802 having a size of 2N×2N, the partition 804 having a size of 2N×N, the partition 806 having a size of N×2N, and the partition 808 having a size of N×N.

The prediction mode information 810 indicates a prediction mode of each partition. For example, the prediction mode information 810 may indicate a mode of prediction encoding performed on a partition indicated by the partition mode information 800, i.e., an intra mode 812, an inter mode 814, or a skip mode 816.

The transformation unit size information 820 specifies a transformation unit to be based on when transformation is performed on a current coding unit. For example, the transformation unit may be one of a first intra transformation unit 822, a second intra transformation unit 824, a first inter transformation unit 826, and a second inter transformation unit 828.

The image data and encoding information extractor 210 of the video decoding apparatus 200 may extract and use the partition mode information 800, the prediction mode information 810, and the transformation unit size information 820 for decoding, according to each deeper coding unit.

Figure 27:
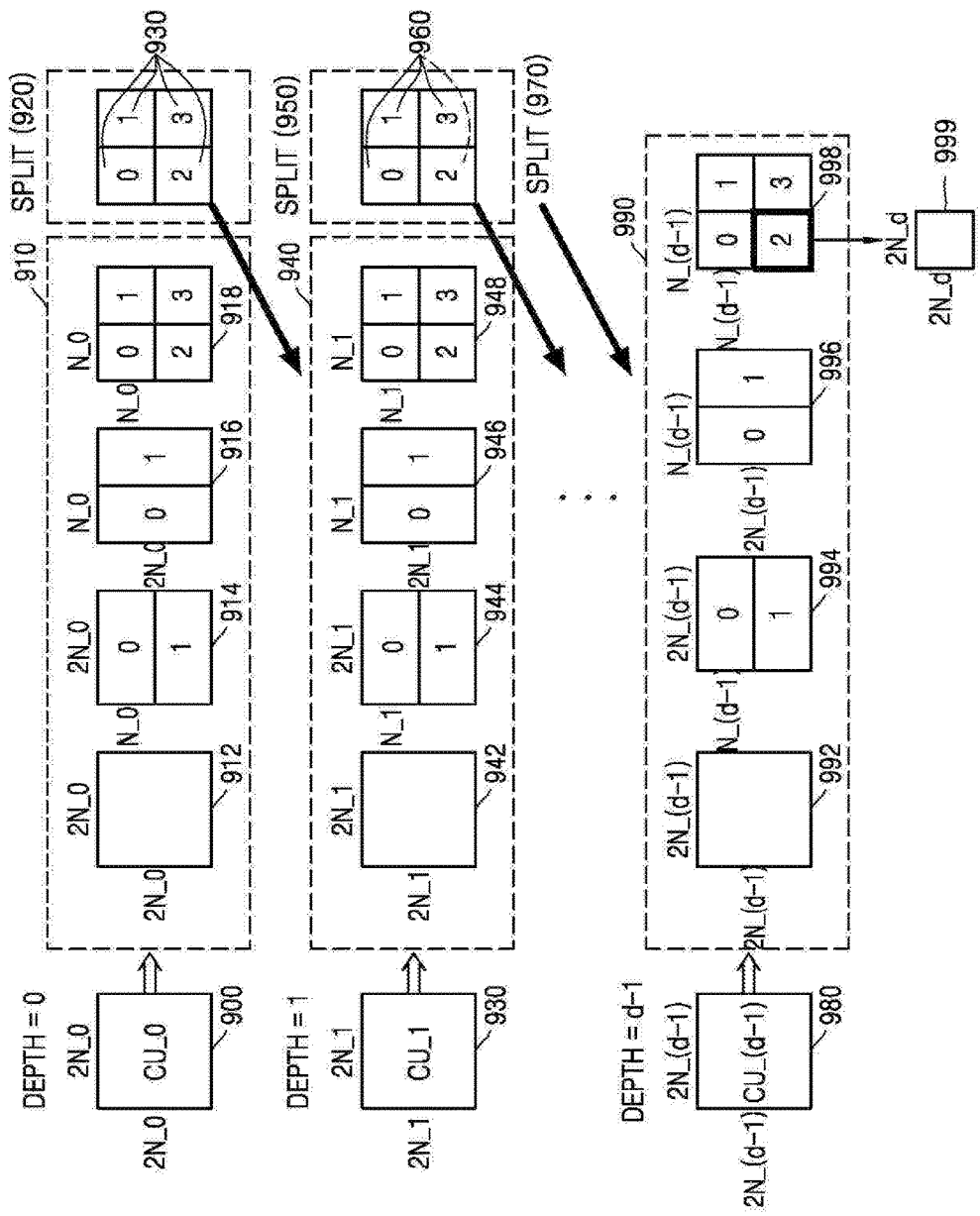
FIG. 27 illustrates deeper coding units according to depths, according to various embodiments.

FIG. 27 illustrates deeper coding units according to depths, according to various embodiments.

Split information may be used to represent a change in a depth. The spilt information specifies whether a coding unit of a current depth is split into coding units of a lower depth.

A prediction unit 910 for prediction encoding a coding unit 900 having a depth of 0 and a size of 2N_0×2N_0 may include partitions of a partition mode 912 having a size of 2N_0×2N_0, a partition mode 914 having a size of 2N_0×N_0, a partition mode 916 having a size of N_0×2N_0, and a partition mode 918 having a size of N_0×N_0. Only the partition modes 912, 914, 916, and 918 which are obtained by symmetrically splitting the prediction unit are illustrated, but as described above, a partition mode is not limited thereto and may include asymmetrical partitions, partitions having a predetermined shape, and partitions having a geometrical shape.

According to each partition mode, prediction encoding has to be repeatedly performed on one partition having a size of 2N_0×2N_0, two partitions having a size of 2N_0×N_0, two partitions having a size of N_0×2N_0, and four partitions having a size of N_0×N_0. The prediction encoding in an intra mode and an inter mode may be performed on the partitions having the sizes of 2N_0×2N_0, N_0×2N_0, 2N_0×N_0, and N_0×N_0. The prediction encoding in a skip mode may be performed only on the partition having the size of 2N_0×2N_0.

If an encoding error is smallest in one of the partition modes 912, 914, and 916 having the sizes of 2N_0×2N_0, 2N_0×N_0 and N_0×2N_0, the prediction unit 910 may not be split into a lower depth.

If the encoding error is the smallest in the partition mode 918 having a size of N_0×N_0, a depth is changed from 0 to 1 and split is performed (operation 920), and encoding may be repeatedly performed on coding units 930 of a partition mode having a depth of 2 and a size of N_0×N_0 so as to search for a minimum encoding error.

A prediction unit 930 for prediction encoding the coding unit 930 having a depth of 1 and a size of 2N_1×2N_1 (=N_0×N_0) may include a partition mode 942 having a size of 2N_1×2N_1, a partition mode 944 having a size of 2N_1×N_1, a partition mode 946 having a size of N_1×2N_1, and a partition mode 948 having a size of N_1×N_1.

If an encoding error is the smallest in the partition mode 948 having the size of N_1×N_1, a depth is changed from 1 to 2 and split is performed (in operation 950), and encoding is repeatedly performed on coding units 960 having a depth of 2 and a size of N_2×N_2 so as to search for a minimum encoding error.

When a maximum depth is d, deeper coding units according to depths may be set until when a depth corresponds to d−1, and split information may be set until when a depth corresponds to d−2. That is, when encoding is performed up to when the depth is d−1 after a coding unit corresponding to a depth of d−2 is split (in operation 970), a prediction unit 990 for prediction encoding a coding unit 980 having a depth of d−1 and a size of 2N_(d−1)×2N_(d−1) may include partitions of a partition mode 992 having a size of 2N_(d−1)×2N_(d−1), a partition mode 994 having a size of 2N_(d−1)×N_(d−1), a partition mode 996 having a size of N_(d−1)×2N_(d−1), and a partition mode 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes so as to search for a partition mode generating a minimum encoding error.

Even when the partition type 998 having the size of N_(d−1)×N_(d−1) has the minimum encoding error, since a maximum depth is d, a coding unit CU_(d−1) having a depth of d−1 is no longer split into a lower depth, and a depth with respect to a current largest coding unit 900 is determined to be d−1 and a partition mode of the current largest coding unit 900 may be determined to be N_(d−1)×N_(d−1). Also, since the maximum depth is d, split information for a coding unit 952 having a depth of d−1 is not set.

A data unit 999 may be a 'minimum unit' for the current largest coding unit. A minimum unit according to the embodiment may be a square data unit obtained by splitting a smallest coding unit having a lowermost depth by 4. By performing the encoding repeatedly, the video encoding apparatus 100 according to the embodiment may select a depth having the least encoding error by comparing encoding errors according to depths of the coding unit 900 to determine a depth, and set a corresponding partition type and a prediction mode as an encoding mode of the depth.

As such, the minimum encoding errors according to depths are compared in all of the depths of 0, 1, . . . , d−1, d, and a depth having the least encoding error may be determined as a depth. The depth, the partition mode of the prediction unit, and the prediction mode may be encoded and transmitted as split information. Also, since a coding unit has to be split from a depth of 0 to a depth, only split information of the depth is set to '0', and split information of depths excluding the depth has to be set to '1'.

The image data and encoding information extractor 220 of the video decoding apparatus 200 according to the embodiment may extract and use a depth and prediction unit information about the coding unit 900 so as to decode the coding unit 912. The video decoding apparatus 200 according to the embodiment may determine a depth, in which split information is '0', as a depth by using split information according to depths, and may use, for decoding, split information about the corresponding depth.

include split information about a coding unit, partition mode information, prediction mode information, and transformation unit size information. Table 1 below shows the encoding information that may be set by the video encoding apparatus 100 and the video decoding apparatus 200 according to the embodiments.

TABLE 1

| | | | Size of Transformation Unit | | |
|---|---|---|---|---|---|
| | Partition Type | | Split Information 0 of Transformation Unit | Split Information 1 of Transformation Unit | |
| Prediction Mode | Symmetrical Partition Type | Asymmetrical Partition Type | | | Split Information 1 |
| Intra Inter Skip (Only 2N × 2N) | 2N × 2N 2N × N N × 2N N × N | 2N × nU 2N × nD nL × 2N nR × 2N | 2N × 2N | N × N (Symmetrical Partition Type) N/2 × N/2 (Asymmetrical Partition Type) | Repeatedly Encode Coding Units having Lower Depth of d + 1 |

Split Information 0 (Encoding on Coding Unit having Size of 2N × 2N and Current Depth of d)

Figure 28:
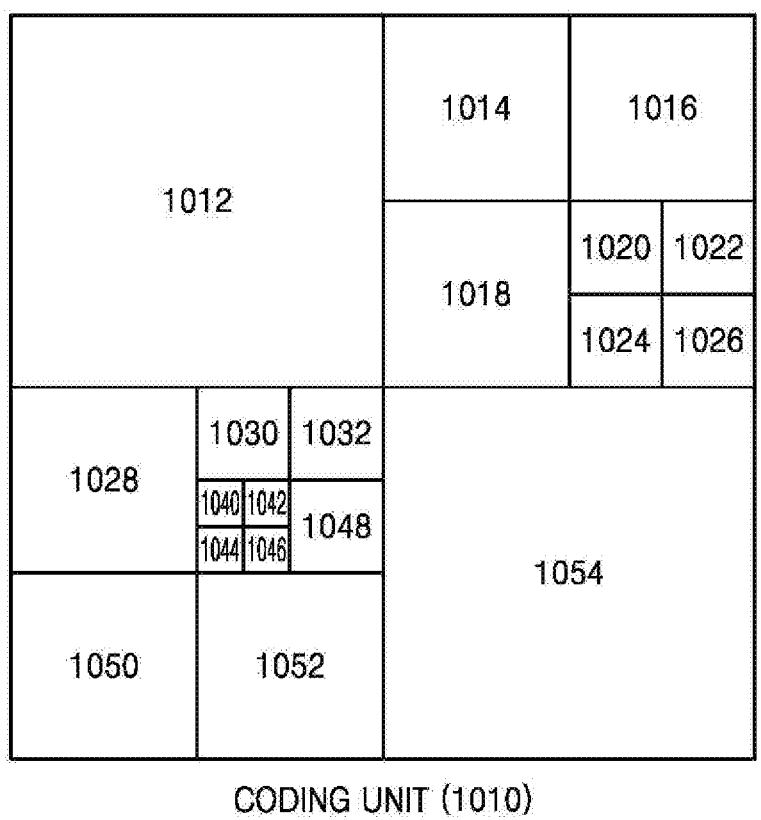
FIGS. 28, 29, and 30 illustrate a relationship between coding units, prediction units, and transformation units, according to various embodiments.
Figure 29:
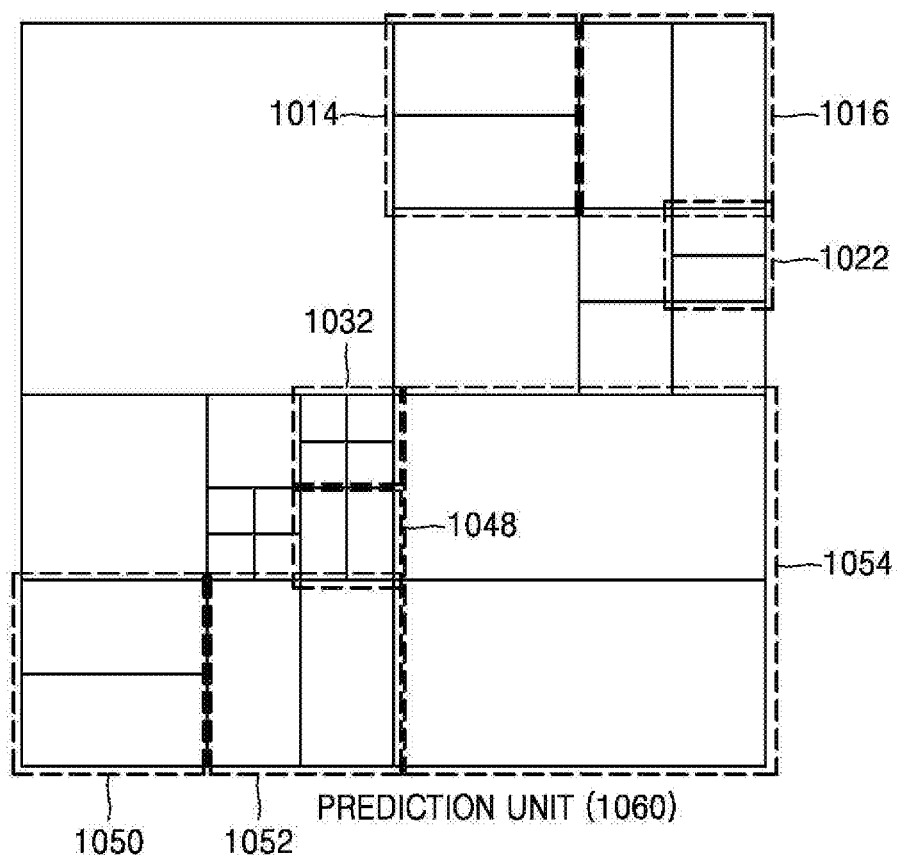
Figure 30:
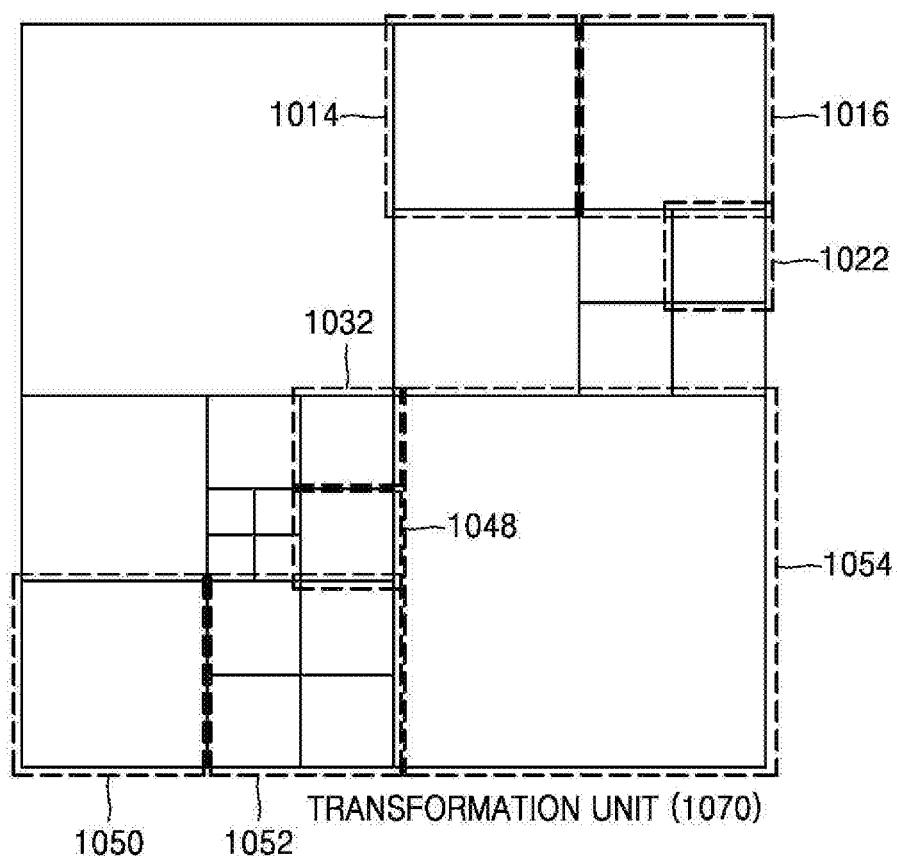

FIGS. 28, 29, and 30 illustrate a relationship between coding units, prediction units, and transformation units, according to various embodiments.

Coding units 1010 are deeper coding units according to depths determined by the video encoding apparatus 100, in a largest coding unit. Prediction units 1060 are partitions of prediction units of each of the coding units 1010 according to depths, and transformation units 1070 are transformation units of each of the coding units according to depths.

When a depth of a largest coding unit is 0 in the deeper coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

Some partitions 1014, 1016, 1022, 1032, 1048, 1050, 1052, and 1054 from among the prediction units 1060 are obtained by splitting the coding unit. That is, partitions 1014, 1022, 1050, and 1054 are a partition mode having a size of 2N×N, partitions 1016, 1048, and 1052 are a partition mode having a size of N×2N, and a partition 1032 is a partition mode having a size of N×N. Prediction units and partitions of the deeper coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, 1052, and 1054 in the transformation units 1060 are data units different from those in the prediction units 1060 in terms of sizes and shapes. That is, the video encoding apparatus 100 and the video decoding apparatus 200 according to the embodiments may perform intra prediction/motion estimation/motion compensation/and transformation/inverse transformation on an individual data unit in the same coding unit.

Accordingly, encoding is recursively performed on each of coding units having a hierarchical structure in each region of a largest coding unit so as to determine an optimum coding unit, and thus coding units according to a recursive tree structure may be obtained. Encoding information may The output unit 130 of the video encoding apparatus 100 according to the embodiment may output the encoding information about the coding units having a tree structure, and the image data and encoding information extractor 220 of the video decoding apparatus 200 according to the embodiment may extract the encoding information about the coding units having a tree structure from a received bitstream.

Split information specifies whether a current coding unit is split into coding units of a lower depth. If split information of a current depth d is 0, a depth, in which a current coding unit is no longer split into a lower depth, is a depth, and thus partition mode information, prediction mode information, and transformation unit size information may be defined for the depth. If the current coding unit has to be further split according to the split information, encoding has to be independently performed on each of four split coding units of a lower depth.

A prediction mode may be one of an intra mode, an inter mode, and a skip mode. The intra mode and the inter mode may be defined in all partition modes, and the skip mode is defined only in a partition mode having a size of 2N×2N.

The partition mode information may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1.

The size of the transformation unit may be set to be two types in the intra mode and two types in the inter mode. That is, if split information of the transformation unit is 0, the size of the transformation unit may be 2N×2N, which is the size of the current coding unit. If split information of the transformation unit is 1, the transformation units may be obtained by splitting the current coding unit. Also, if a partition mode of the current coding unit having the size of 2N×2N is a symmetrical partition mode, a size of a transformation unit may be N×N, and if the partition mode of the current coding unit is an asymmetrical partition mode, the size of the transformation unit may be N/2×N/2.

The encoding information about coding units having a tree structure according to the embodiment may be assigned to at least one of a coding unit corresponding to a depth, a prediction unit, and a minimum unit. The coding unit corresponding to the depth may include at least one of a prediction unit and a minimum unit containing the same encoding information.

Accordingly, it is determined whether adjacent data units are included in the same coding unit corresponding to the depth by comparing encoding information of the adjacent data units. Also, a corresponding coding unit corresponding to a depth is determined by using encoding information of a data unit, and thus a distribution of depths in a largest coding unit may be inferred.

Accordingly, if a current coding unit is predicted based on encoding information of adjacent data units, encoding information of data units in deeper coding units adjacent to the current coding unit may be directly referred to and used.

In another embodiment, if a current coding unit is predicted based on encoding information of adjacent data units, data units adjacent to the current coding unit may be searched by using encoded information of the data units, and the searched adjacent coding units may be referred for predicting the current coding unit.

Figure 31:
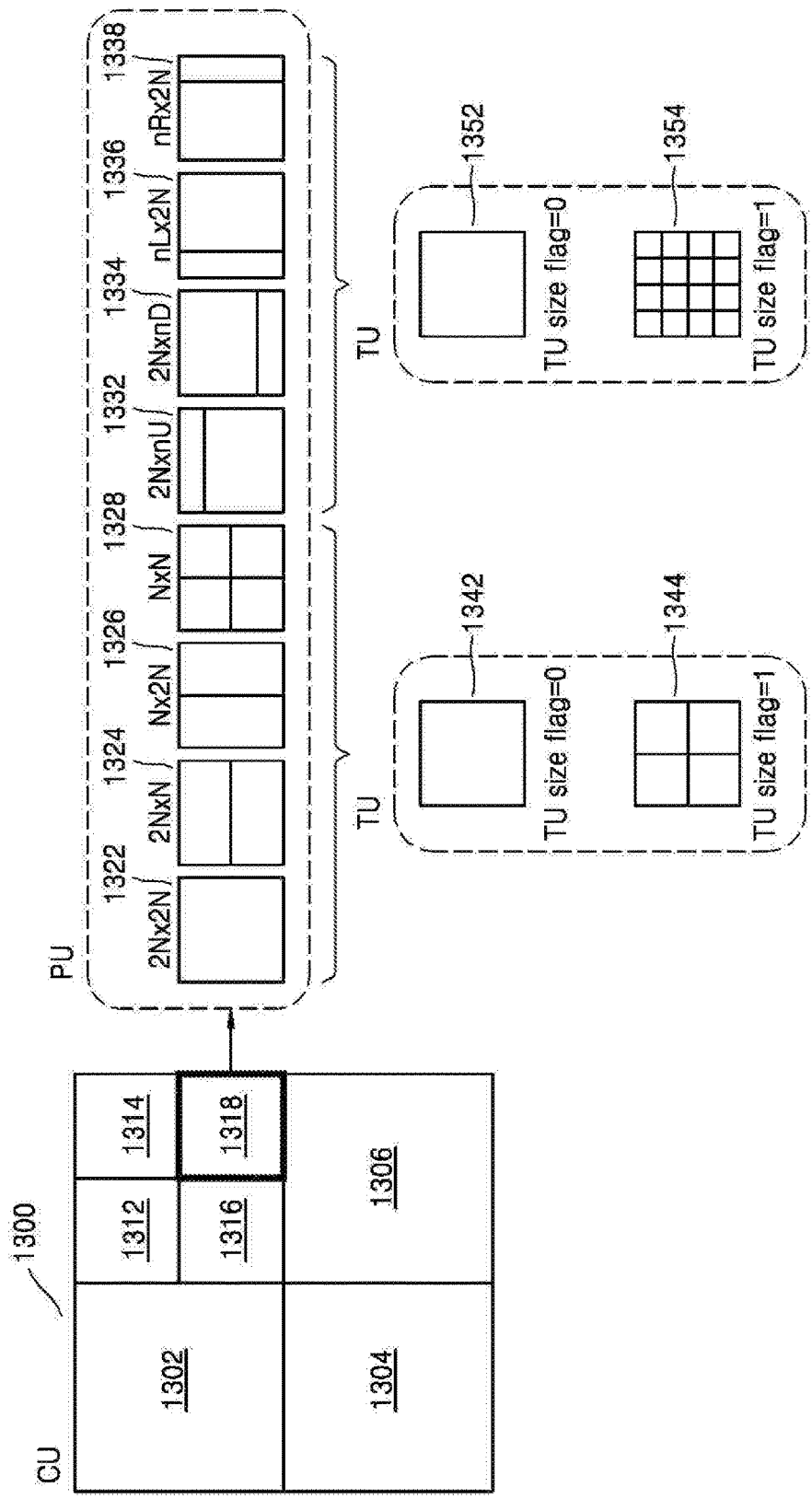
FIG. 31 illustrates a relationship between a coding unit, a prediction unit, and a transformation unit, according to encoding mode information of Table 1.

FIG. 31 illustrates a relationship between a coding unit, a prediction unit, and a transformation unit, according to encoding mode information of Table 1.

A largest coding unit 1300 includes coding units 1302, 1304, 1306, 1312, 1314, 1316, and 1318 of depths. Here, since the coding unit 1318 is a coding unit of a depth, split information may be set to 0. Partition mode information of the coding unit 1318 having a size of 2N×2N may be set to be one of partition modes including 2N×2N 1322, 2N×N 1324, N×2N 1326, N×N 1328, 2N×nU 1332, 2N×nD 1334, nL×2N 1336, and nR×2N 1338.

Transformation unit split information (TU size flag) is a type of a transformation index, and a size of a transformation unit corresponding to the transformation index may be changed according to a prediction unit type or partition mode of the coding unit.

For example, when the partition mode information is set to be one of symmetrical partition modes 2N×2N 1322, 2N×N 1324, N×2N 1326, and N×N 1328, if the transformation unit split information is 0, a transformation unit 1342 having a size of 2N×2N is set, and if the transformation unit split information is 1, a transformation unit 1344 having a size of N×N may be set.

When the partition mode information is set to be one of asymmetrical partition modes 2N×nU 13032, 2N×nD 1334, nL×2N 1336, and nR×2N 1338, if the transformation unit split information (TU size flag) is 0, a transformation unit 1352 having a size of 2N×2N may be set, and if the transformation unit split information is 1, a transformation unit 1354 having a size of N/2×N/2 may be set.

The transformation unit split information (TU size flag) described above with reference to FIG. 30 is a flag having a value or 0 or 1, but the transformation unit split information according to an embodiment is not limited to a flag having 1 bit, and the transformation unit may be hierarchically split while the transformation unit split information increases in a manner of 0, 1, 2, 3 . . . etc., according to setting. The transformation unit split information may be an example of the transformation index.

In this case, the size of a transformation unit that has been actually used may be expressed by using the transformation unit split information according to the embodiment, together with a maximum size of the transformation unit and a minimum size of the transformation unit. The video encoding apparatus 100 according to the embodiment may encode maximum transformation unit size information, minimum transformation unit size information, and maximum transformation unit split information. The result of encoding the maximum transformation unit size information, the minimum transformation unit size information, and the maximum transformation unit split information may be inserted into an SPS. The video decoding apparatus 200 according to the embodiment may decode video by using the maximum transformation unit size information, the minimum transformation unit size information, and the maximum transformation unit split information.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be smaller than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit may be defined by Equation (1):

$$\text{CurrMinTuSize} = \max(\text{MinTransformSize}, \text{RootTuSize}/(2^{\text{MaxTransformSizeIndex}})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. That is, in Equation (1), 'RootTuSize/(2^MaxTransformSizeIndex)' denotes a transformation unit size when the transformation unit size 'RootTuSize', when the TU size flag is 0, is split by the number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize} = \min(\text{MaxTransformSize}, \text{PUSize}) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize=\min(MaxTransformSize,PartitionSize) \quad (3)$$

That is, if the current prediction mode is the intra mode, the transformation unit size 'RootTuSize' when the TU size flag is 0 may be a smaller value from among the size of the maximum transformation unit and the size of the current partition unit.

However, the current maximum transformation unit size 'RootTuSize' that varies according to the type of a prediction mode in a partition unit is just an embodiment, and a factor for determining the current maximum transformation unit size is not limited thereto.

According to the video encoding method based on coding units of a tree structure described above with reference to FIGS. 19 through 20, image data of a spatial domain is encoded in each of the coding units of the tree structure, and the image data of the spatial domain is reconstructed in a manner that decoding is performed on each largest coding unit according to the video decoding method based on the coding units of the tree structure, so that a video that is formed of pictures and picture sequences may be reconstructed. The reconstructed video may be reproduced by a reproducing apparatus, may be stored in a storage medium, or may be transmitted via a network.

While the present invention has been particularly shown and described with reference to exemplary embodiments thereof, it will be understood by those of ordinary skill in the art that various changes in form and details may be made therein without departing from the spirit and scope of the following claims. Therefore, the exemplary embodiments should be considered in a descriptive sense only and not for purposes of limitation. The scope of the present invention is defined not by the detailed description of the present invention but by the appended claims, and all differences within the scope will be construed as being included in the present invention.

The invention claimed is:

1. A multiview video decoding method comprising:
obtaining, from a bitstream, motion inheritance information specifying whether or not motion information of a corresponding block of a first layer which corresponds to a current block of a second layer is available as motion information of the second layer;
obtaining prediction mode information of the current block from the bitstream;
when a prediction mode of the current block of the second layer is a merge mode, and the motion inheritance information indicates that the motion information of the corresponding block of the first layer is available as the motion information of the second layer, obtaining a merge candidate list comprising for the current block of the second layer including, as a merge candidate, the motion information of the corresponding block of the first layer;
obtaining, from the bitstream, merge index information indicating a merge candidate that is from among merge candidates included in the merge candidate list and is to be used in predicting the current block; and
obtaining motion information of the current block, based on the merge index information,
wherein the merge inheritance information is a motion parameter inheritance flag (MPI_flag) indicating whether or not an MPI candidate from among the merge candidates is used, and
the obtaining of the merge candidate list comprises determining, by using the MPI_flag, whether or not to comprise the MPI candidate in the merge candidate list.

2. The multiview video decoding method of claim 1, wherein the motion information comprises a direction of a reference picture, a reference picture index, and a motion vector predictor value.

3. The multiview video decoding method of claim 1, wherein the obtaining of the merge candidate list comprises:
determining a maximum number of merge candidates of the current block, based on the motion inheritance information; and
when a number of the merge candidates comprised in the merge candidate list is less than the maximum number, adding, to the merge candidate list, at least one of an inter-view candidate, a spatial candidate, a disparity candidate, a view synthesis prediction candidate, and a temporal candidate, according to a predetermined priority order, in addition to the motion information of the corresponding block.

4. The multiview video decoding method of claim 3, wherein the maximum number of the merge candidates has a value corresponding to a preset maximum number of the merge candidates according to the motion inheritance information, or a value obtained by increasing the preset maximum number of the merge candidates by 1.

5. The multiview video decoding method of claim 4, wherein,
when the motion inheritance information, which has a value of 1 when the motion information of the corresponding block is available as the motion information of the second layer and has a value of 0 when the motion information of the corresponding block is unavailable as the motion information of the second layer, is an MPI_flag, information specifying use or non-use of the inter-view candidate that has a value of 1 when the inter-view candidate is used and has a value of 0 when the inter-view candidate is not used is iv_mv_pred_flag, and a value obtained by subtracting a value of 5 from the preset maximum number of the merge candidates is five_minus_max_num_merge_cand,
the maximum number of the merge candidates corresponds to (5-five_minus_max_num_merge_cand)+(iv_mv_pred_flag//MPI_flag).

6. The multiview video decoding method of claim 4, wherein,
when the motion inheritance information, which has a value of 1 when the motion information of the corresponding block is available as the motion information of the second layer and has a value of 0 when the motion information of the corresponding block is unavailable as the motion information of the second layer, is an MPI_flag, information specifying use or non-use of the inter-view candidate that has a value of 1 when the inter-view candidate is used and has a value of 0 when the inter-view candidate is not used is iv_mv_pred_flag, information specifying use or non-use of the view synthesis prediction candidate that has a value of 1 when the view synthesis prediction candidate is used and has a value of 0 when the view synthesis prediction candidate is not used is view_synthesis_pred_flag, and a value obtained by subtracting a value of 5 from the preset maximum number of the merge candidates is five_minus_max_num$_{13}$ merge_cand, the maximum number of the merge candidates corresponds to (5-five_minus_max_num_merge_cand)+ (iv_mv_pred_flag//view synthesis_pred_flag//MPI_flag).

7. The multiview video decoding method of claim 1, wherein the obtaining of the motion information of the current block comprises:

obtaining, from the bitstream, a difference value with respect to a difference between a motion vector of the current block and a motion vector predictor; and obtaining the motion vector of the current block by adding up the difference value and the motion vector predictor of the merge candidate determined based on the merge index information.

8. The multiview video decoding method of claim 1, wherein:

a multiview video comprises color texture images at a plurality of views and a depth image, and the second layer corresponds to the depth image, and the first layer corresponds to a color texture image at one view from among the color texture images at the plurality of views.

9. A multiview video decoding apparatus comprising:

a parser configured to obtain, from a bitstream, motion inheritance information specifying whether or not motion information of a corresponding block of a first layer which corresponds to a current block of a second layer is available as motion information of the second layer, prediction mode information of the current block, and merge index information indicating a merge candidate from among merge candidates included in a merge candidate list and is to be used in predicting the current block; and an inter predictor configured to obtain the merge candidate list including, as a merge candidate, the motion information of the corresponding block, when a prediction mode of the current block is a merge mode, and the motion inheritance information indicates that the motion information of the corresponding block is available as the motion information of the second layer, and to obtain motion information of the current block, based on the merge index information, wherein the merge inheritance information is a motion parameter inheritance flag (MPI_flag) indicating whether or not an MPI candidate from among the merge candidates is used, and the obtaining of the merge candidate list comprises determining, by using the MPI_flag, whether or not to comprise the MPI candidate in the merge candidate list.

10. A multiview video encoding method comprising:

determining whether motion information of a corresponding block of a first layer which corresponds to a current block of a second layer is available as motion information of the second layer;

when the motion information of the corresponding block is available as the motion information of the second layer, determining a merge candidate list including, as a merge candidate, the motion information of the corresponding block;

performing inter prediction on the current block by using merge candidates comprised in the merge candidate list, and determining, from among the merge candidates, a merge candidate to be used in predicting the current block; and adding, to a bitstream, motion inheritance information including whether the motion information of the corresponding block of the first layer is available as the motion information of the second layer, prediction mode information related to the current block, and merge index information indicating the determined merge candidate, wherein:

the determining of the merge candidate list comprises determining whether or not to form the merge candidate list by using a motion parameter inheritance (MPI) candidate, and the adding comprises adding, to the bitstream, information that is an MPI_flag indicating whether or not the MPI candidate is used as the merge candidate.

11. The multiview video encoding method of claim 10, wherein the determining of the merge candidate list comprises:

determining a maximum number of merge candidates of the current block, based on the motion inheritance information; and when a number of the merge candidates comprised in the merge candidate list is less than the maximum number, adding, to the merge candidate list, at least one of an inter-view candidate, a spatial candidate, a disparity candidate, a view synthesis prediction candidate, and a temporal candidate, according to a predetermined priority order, in addition to the motion information of the corresponding block.

12. The multiview video encoding method of claim 11, wherein, when the motion inheritance information, which has a value of 1 when the motion information of the corresponding block is available as the motion information of the second layer and has a value of 0 when the motion information of the corresponding block is unavailable as the motion information of the second layer, is an MPI_flag, information specifying use or non-use of the inter-view candidate that has a value of 1 when the inter-view candidate is used and has a value of 0 when the inter-view candidate is not used is iv_mv_pred_flag, and a value obtained by subtracting a value of 5 from the preset maximum number of the merge candidates is five_minus_max_num_merge_cand, the maximum number of the merge candidates corresponds to (5-five_minus_max_num_merge_cand)+ (iv_mv_pred_flag//MPI_flag).

* * * * *